(12) United States Patent
Ohba

(10) Patent No.: US 10,715,695 B2
(45) Date of Patent: Jul. 14, 2020

(54) IMAGE PROCESSING APPARATUS

(71) Applicant: Konica Minolta Inc., Tokyo (JP)

(72) Inventor: Shin Ohba, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/361,287

(22) Filed: Mar. 22, 2019

(65) Prior Publication Data

US 2019/0306330 A1 Oct. 3, 2019

(30) Foreign Application Priority Data

Mar. 27, 2018 (JP) .................. 2018-059886

(51) Int. Cl.
*H04N 1/00* (2006.01)
(52) U.S. Cl.
CPC ....... *H04N 1/0097* (2013.01); *H04N 1/00209* (2013.01); *H04N 1/00331* (2013.01); *H04N 1/00923* (2013.01); *H04N 2201/0094* (2013.01)
(58) Field of Classification Search
CPC ............. H04N 1/0097; H04N 1/00923; H04N 1/00331; H04N 1/00209; H04N 2201/0094
USPC ...................................................... 358/1.14
See application file for complete search history.

(56) References Cited

U.S. PATENT DOCUMENTS

2017/0244854 A1* 8/2017 Ito ................... H04N 1/00928
2018/0063350 A1* 3/2018 Kodama ................ G06F 3/122

FOREIGN PATENT DOCUMENTS

JP          2014013543 A      1/2014

* cited by examiner

*Primary Examiner* — Tammy Paige Goddard
*Assistant Examiner* — Darryl V Dottin
(74) *Attorney, Agent, or Firm* — Rankin, Hill & Clark LLP

(57) ABSTRACT

An image processing apparatus includes: a volatile storage device; a hardware processor that executes an information process using the volatile storage device; and a nonvolatile storage device that stores data to be used for the information process, wherein in response to a condition that makes it impossible to continue the information process being satisfied while the information process is being executed, the hardware processor generates a snapshot of the volatile storage device and stores the snapshot in an area of the nonvolatile storage device having a use other than snapshot storage, and in response to a condition that makes it possible to resume the information process being satisfied, the hardware processor reads the snapshot from the nonvolatile storage device and resumes the information process.

18 Claims, 38 Drawing Sheets

| BOX NAME | JOB NAME | DATE OF LAST VIRUS SCAN |
|---|---|---|
| BOX 1 | JOB 1 | 2017/11/28 |
| BOX 2 | JOB 2 | 2016/11/28 |
| BOX 3 | JOB 3 | 2015/11/28 |

DATE OF LAST VIRUS SCAN ON JOB IN BOX

FIG. 32

GROUP CONFIGURATION LIST 3200

| GROUP | IP ADDRESS | TYPE |
|---|---|---|
| GROUP A | 1.1.1.1 | TM |
| | 1.1.1.2 | ST |
| | 1.1.1.3 | ST |
| | 1.1.1.4 | CL |
| | 1.1.1.5 | CL |
| | 1.1.1.6 | CL |
| GROUP B | 2.1.1.1 | TM |
| | 2.1.1.2 | ST |
| | 2.1.1.3 | ST |
| | 2.1.1.4 | CL |

IMAGE PROCESSING APPARATUS

The entire disclosure of Japanese patent Application No. 2018-059886, filed on Mar. 27, 2018, is incorporated herein by reference in its entirety.

BACKGROUND

Technological Field

The present disclosure relates to a technique for promptly reproducing the operation state of an image processing apparatus by generating a snapshot of data, of a primary storage device, storing the snapshot in a nonvolatile memory, and expanding the snapshot in the primary storage device.

Description of the Related Art

Image processing apparatuses such as multi-functional peripheral (MFP) have acquired multiple functions and now are enable to execute many types of processes in addition to print jobs. While executing a print job, an image processing apparatus is unlikely to be turned off and become unable to execute the job. While executing other types of processes, however, the image processing apparatus is more liable to get into such a situation. In particular, from the viewpoint of power saving, it is desirable to avoid supplying much power to the image processing apparatus only for processes that need not be executed in a hurry.

In view of such a background, an image processing apparatus having a hibernation function has been proposed. For example, JP 2014-13543 A has proposed a technique for making effective use of both an overwrite erasing function mid a hibernation function of an image forming apparatus.

The proposed technique includes, as an exemplary hibernation function, storing data of a primary storage device such as a random access memory (RAM) in a nonvolatile memory as a snapshot when a process is interrupted in the image processing apparatus. According to this technique, the operation state of the image processing apparatus is saved in a short time. As a result, even after the image processing apparatus is unexpectedly turned off and suddenly interrupts its process, the state of the image processing apparatus at that time can be reproduced. Snapshots are used to make it possible to read the operation state in a short time, which enables high-speed activation.

In the case of using snapshots, in general, a snapshot area needs to be secured in the nonvolatile memory. This causes the following problem: the capacity of the nonvolatile memory required by the image processing apparatus is increased, and the cost of manufacturing the image processing apparatus is increased.

SUMMARY

The present disclosure has been made in view of the above circumstances, and an object thereof is to provide an image processing apparatus capable of utilizing reproduction of an operation state using a snapshot while avoiding an increase in manufacturing cost.

To achieve the abovementioned object, according to an aspect of the present invention, an image processing apparatus reflecting one aspect of the present invention comprises: a volatile storage device; a hardware processor that executes an information process using the volatile storage device; and a nonvolatile storage device that stores data to be used for the information process, wherein in response to a condition that makes it impossible to continue the information process being satisfied while the information process is being executed, the hardware processor generates a snapshot of the volatile storage device and stores the snapshot in an area of the nonvolatile storage device having a use other than snapshot storage, and in response to a condition that makes it possible to resume the information process being satisfied, the hardware processor reads the snapshot from the nonvolatile storage device and resumes the information process.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 32 is an example of information representing the configuration of each group;

DETAILED DESCRIPTION OF EMBODIMENTS

Hereinafter, one or more embodiments of the present invention will be described with reference to the drawings. However, the scope of the invention is not limited to the disclosed embodiments. In the following description, identical parts and components are denoted by the same reference signs. Their names and functions are also the same. Therefore, these explanations will not be repeated.

1. Appearance of Image Processing Apparatus

Figure 1:
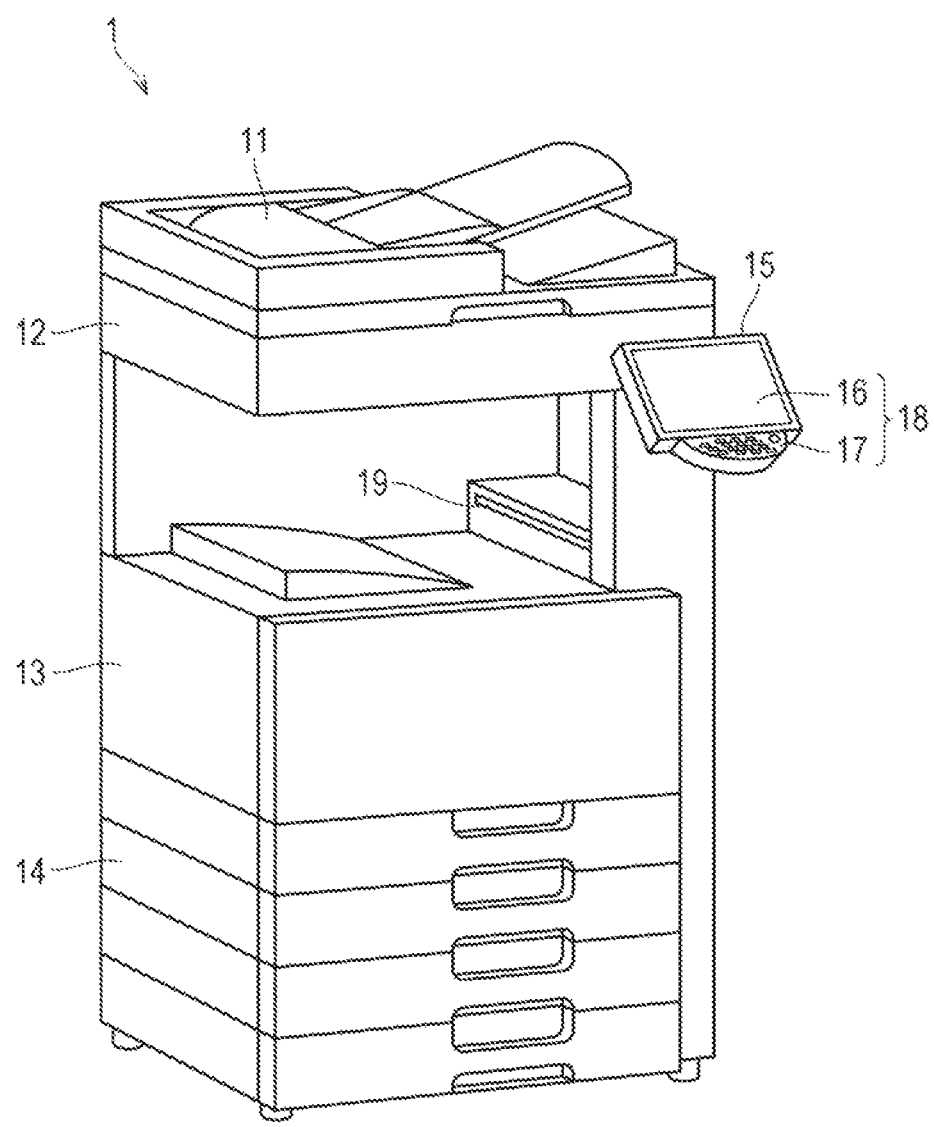
FIG. 1 is a diagram illustrating an appearance of an image processing apparatus.

FIG. 1 is a diagram illustrating an appearance of an image processing apparatus.

With reference to FIG. 1, the image processing apparatus 1 is implemented by, for example, an MFP. The image processing apparatus 1 includes a document conveyer 11 and a scanner 12 on the upper part thereof. The scanner 12 is an example of a document reading device. The document conveyer 11 automatically conveys documents one by one to the scanner 12. The scanner 12 optically reads characters, symbols, images, and the like recorded on each conveyed document.

A printer 13 is provided below the scanner 12, and a paper feeder 14 for supplying paper to the printer 13 is provided below the printer 13. The printer 13 functions to execute a job relating to copying, network printer, or fax transmission/reception, forms an image on a sheet supplied from the paper feeder 14, and outputs the print from a discharge port 19.

The printer 13 forms an image using, for example, an electrophotographic method. In the printer 13, after an electrostatic latent image is formed on a photoconductor, a toner image is formed on the photoconductor. The toner image is transferred onto an intermediate transfer belt and then transferred onto a sheet. The toner image on the sheet is fixed by being heated and pressed by a fixing device.

On the front side of the image processing apparatus 1, a controller unit including a display 15 and an operation part 18 is provided. The display 15 displays information about a job and other items of information to the user, and is implemented by, for example, a liquid crystal display. The operation part 18 includes a touch panel 16 arranged on the front side of the display 15 and one or more operation buttons 17 arranged near the display 15.

2. Configuration of Image Processing Apparatus

Figure 2:
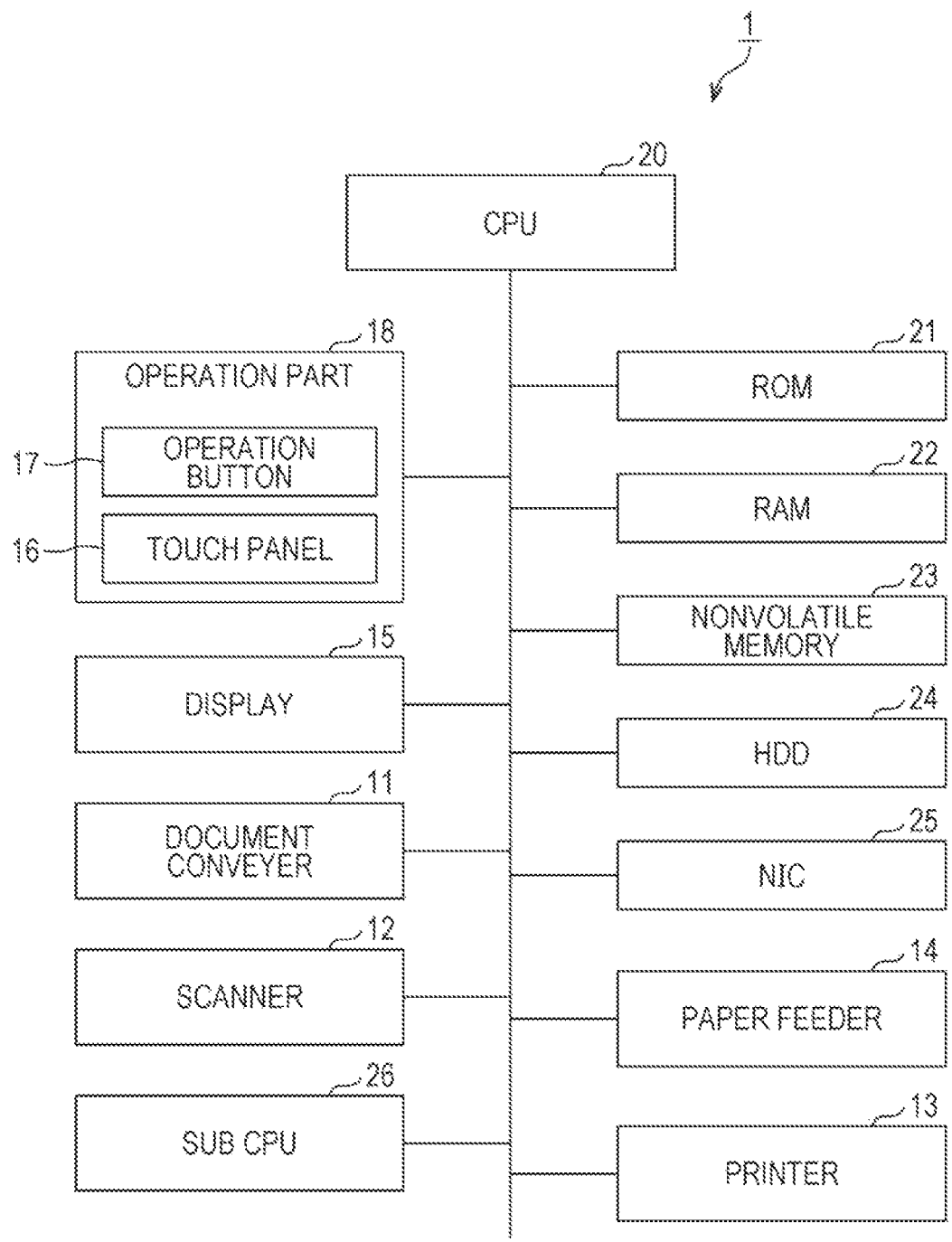
FIG. 2 is a diagram illustrating an exemplary hardware configuration of the image processing apparatus.

FIG. 2 is a diagram illustrating an exemplary hardware configuration of the image processing apparatus.

In addition to the configuration illustrated in FIG. 1, the image processing apparatus 1 includes a central processing unit (CPU) 20, a read only memory (ROM) 21, a RAM 22, a nonvolatile memory 23, a hard disk drive (HDD) 24, and a communication interface 25. By reading and executing the program stored in the ROM 21 on the RAM 22, the CPU 20 implements basic functions (copying, network printer, scanner, facsimile (hereinafter referred to as FAX) document transmission/reception, etc.) as the image processing apparatus.

The communication interface 25 is an interface for communicating with external devices such as data communication with an information processing apparatus such as a server or a personal computer (PC) via a network and FAX document transmission/reception via a telephone line. As the communication interface 25, for example, a network interface card (NIC), a modem, a terminal adapter (TA), wireless communication, or the like is used.

The program stored in the ROM 21 can be updated to the latest version program by downloading it from an external device via a network or the like.

The image processing apparatus 1 can operate in the normal mode and the power saving mode. In the normal mode, power is supplied to all the elements illustrated in FIG. 1. In the power saving mode, power is supplied only to a sub CPU 26, and power supply to the elements other than the sub CPU 26 such as the CPU 20 and the ROM 21 is cut off.

When a condition for transition from the normal mode to the power saving mode is satisfied, the CPU 20 instructs the sub CPU 26 to operate in the power saving mode, and stops power supply to the elements such as the CPU 20. In the power saving mode, the sub CPU 26 executes an operation such as a proxy response. When a condition for transition from the power saving mode to the normal mode is satisfied, the sub CPU 26 instructs the CPU 20 to start up. As a result, the CPU 20 is activated, and the image processing apparatus 1 operates in the normal mode.

3. Example of Use of RAM

Figure 3:
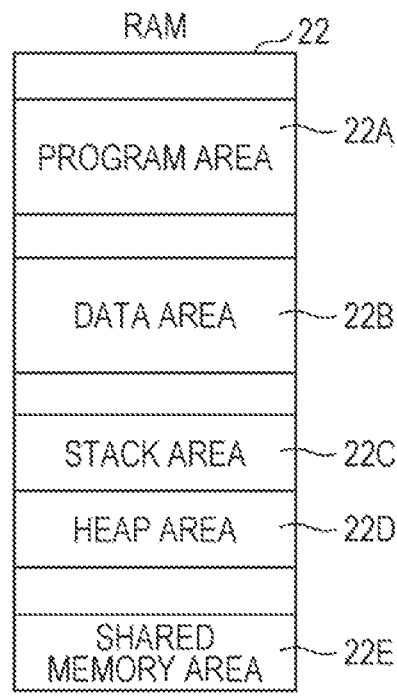
FIG. 3 is a diagram illustrating an example of use of a storage area of a RAM.

FIG. 3 is a diagram illustrating an example of use of a storage area of the RAM 22.

In one example, a program area 22A, a data area 22B, a stack area 22C, a heap area 22D, and a shared memory area 22E are set in the RAM 22.

In the program area 22A, a compiled program is saved. The CPU 20 operates based on the logic of this program.

In the data area 22B, variable data such as arrays are saved. In the stack area 22C, context data of each task are saved. In the heap area 22D, dynamically secured variable data are saved. In the shared memory area 22E, shared variable data handled as data shared by each task are saved.

4. Example of Use of Nonvolatile Memory

First Example of Use

Figure 4:
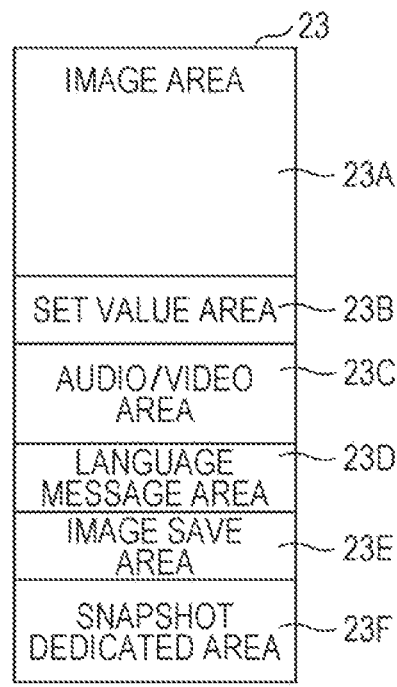
FIG. 4 is a diagram for explaining a first example of use of a storage area of a nonvolatile memory.
Figure 5:
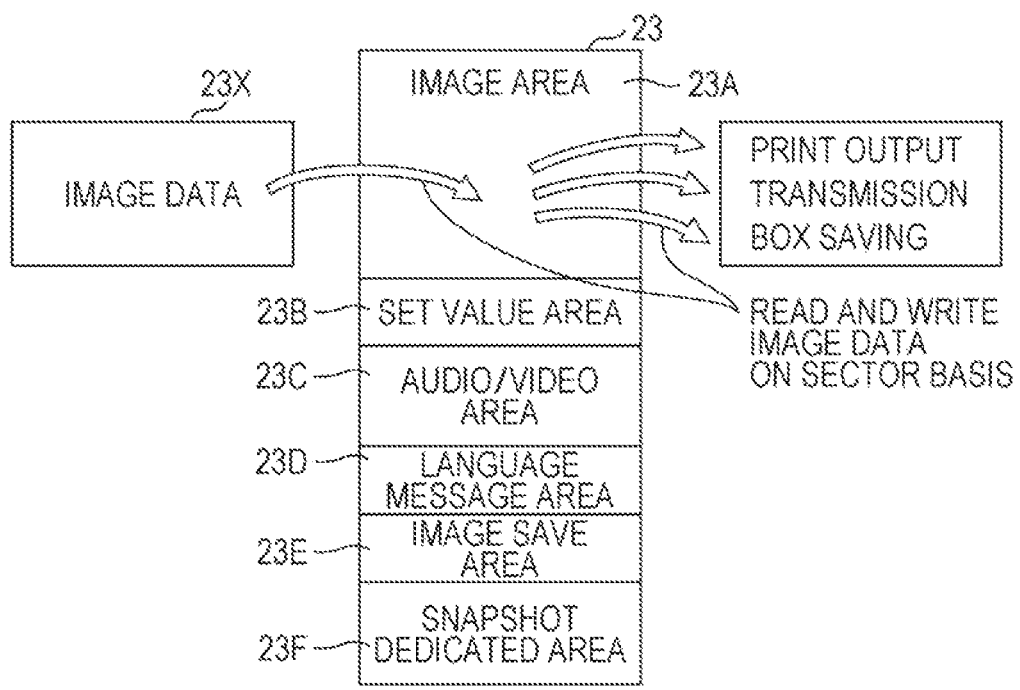
FIG. 5 is a diagram for explaining the first example of use of the storage area of the nonvolatile memory.
Figure 6:
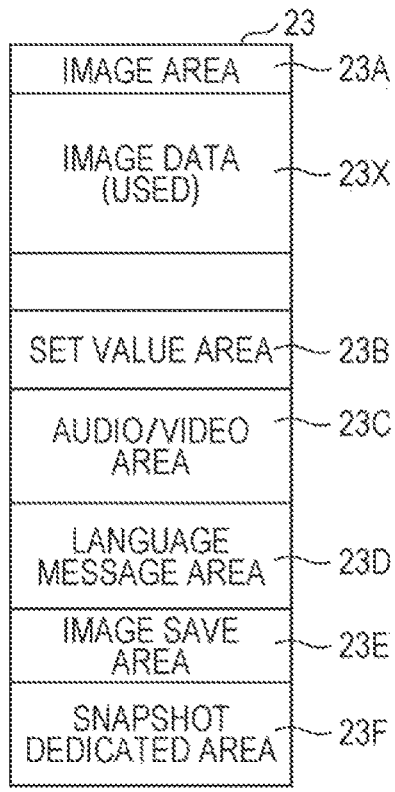
FIG. 6 is a diagram for explaining the first example of use of the storage area of the nonvolatile memory.

FIGS. 4 to 6 are diagrams for explaining a first example of use of a storage area of the nonvolatile memory 23.

As illustrated in FIG. 4, an image area 23A, a set value area 23B, an audio/video area 23C, a language message area 23D, an image save area 23E, and a snapshot dedicated area 23F are set in the nonvolatile memory 23.

In the image area 23A, image data, read by the scanner 12, image data generated by raster image processing (RIP) on page description language (PDL) data acquired upon receiving a print job, and/or binary image data acquired by reception through FAX communication are saved. In the set value area 23B, the value set in the operation part 18 is saved. Audio data and content data of video guidance upon JAM occurrence are saved in the audio/video area 23C. Messages (including multiple languages) to be displayed on the panel are saved in the language message area 23D. Intermediate buffers are temporarily stored in the image save area 23E when a large number of intermediate buffers are generated in the RIP processing for PDL data. Each of the image area 23A, the set value area 23B, the audio/video area 23C, the language message area 23D, and the image save area 23E is an example of an area having a use other than snapshot storage.

The snapshot dedicated area 23F is an example of an area that is set separately from the image area 23A. the set value area 23B, the audio/video area 23C, the language message area 23D, and the image save area 23E to be used only for snapshot storage. A snapshot of the RAM 22 is stored in the snapshot dedicated area 23F. In one example, when making the transition to the power saving mode, the CPU 20 generates a snapshot of the RAM 22 and stores the snapshot in the snapshot dedicated area 23F. If the snapshot dedicated area 23F contains a snapshot at the time of activation, the CPU 20 expands the snapshot in the RAM 22. As a result, the image processing apparatus 1 resumes the operation at high speed in the manner stored at the time of transition to the power saving mode.

With reference to FIGS. 5 and 6, the flow of image data during job execution in the nonvolatile memory 23 will be described.

When the image processing apparatus 1 executes a print job, the CPU 20 stores the image data included in the job transmitted from a PC or the like in the image area 23A (FIG. 5) and instructs the printer 13. When the image formation of the image data by the printer 13 is completed, the part of the image area 23A it) which the image data have been stored becomes a used area (FIG. 6). In FIG. 6, the used area is illustrated as an area 23X.

In the nonvolatile memory 23, an area that stores information for managing areas in use and used areas in the image area 23A is set. This area is omitted from FIGS. 4 to 6.

When the image processing apparatus 1 executes a box saving process, the CPU 20 stores the image data generated by the scanner 12 in the image area 23A (FIG. 5) and transfers the image data to another device or a box (storage area in the HDD 24). When the transfer is completed, the part of the image area 23A in which the image data have been stored becomes a used area (FIG. 6).

When the image processing apparatus 1 executes a FAX reception job, the CPU 20 stores the image data received by the FAX communication in the image area 23A (FIG. 5). Thereafter, in accordance with the settings in the job, the CPU 20 instructs the printer 13 to print the image data in the image area 23A and/or transfers the image data to another device or a box. When the transfer is completed, the part of the image area 23A in which the image data have been stored becomes a used area (FIG. 6).

When the image processing apparatus 1 executes a FAX transmission job, the CPU 20 stores the image data generated by the scanner 12 in the image area 23A (FIG. 5). Thereafter, in accordance with the settings in the job, the image data stored in the image area 23A are transferred to the apparatus designated as the destination. When the transfer is completed, the part of the image area 23A in which the image data have been stored becomes a used area (FIG. 6).

Second Example of Use

Figure 7:
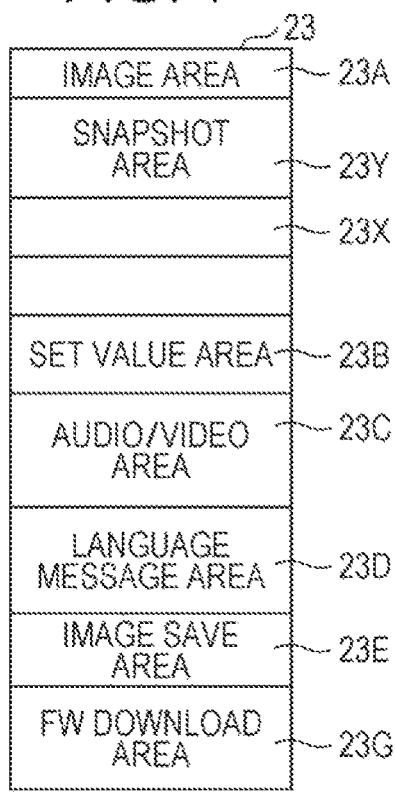
FIG. 7 is a diagram for explaining a second example of use of the storage area of the nonvolatile memory.

FIG. 7 is a diagram for explaining a second example of use of the storage area of the nonvolatile memory 23.

In the example of FIG. 7, the area, set as the snapshot dedicated area 23F in FIGS. 4 to 6 is set as a firmware (FW) download area 23G. The FW download area 23G is an example of a storage area used for information processes relating to image processes.

In the FW download area 23G, FW data to be stored in the ROM and/or data for updating FW data are temporarily saved. The FW download area 23G is used when FW and update data are downloaded via the network. In FIG. 7, the part of the image area 23A used for snapshot storage is illustrated as a snapshot area 23Y.

In the example of FIG. 7, the CPU 20 uses the used (or unused) area 23X of the image area 23A for snapshot storage. More specifically, the CPU 20 mounts the used area 23X of the image area 23A using a file system. As a result, a partition for snapshot storage is set in the area 23X. Thereafter, the CPU 20 stores the file of the snapshot in the area 23X. As a result, in contrast to the example of FIG. 4 and the like, the FW download area 23G can be set in the nonvolatile memory 23 without increasing the capacity of the nonvolatile memory 23.

In the second example of use, the area (FW download area 23G) of the nonvolatile memory 23 having a use different from snapshot storage is also used for snapshot storage. The FW download area 23G is another example of an area having a use other than snapshot storage.

Third Example of Use

Figure 8:
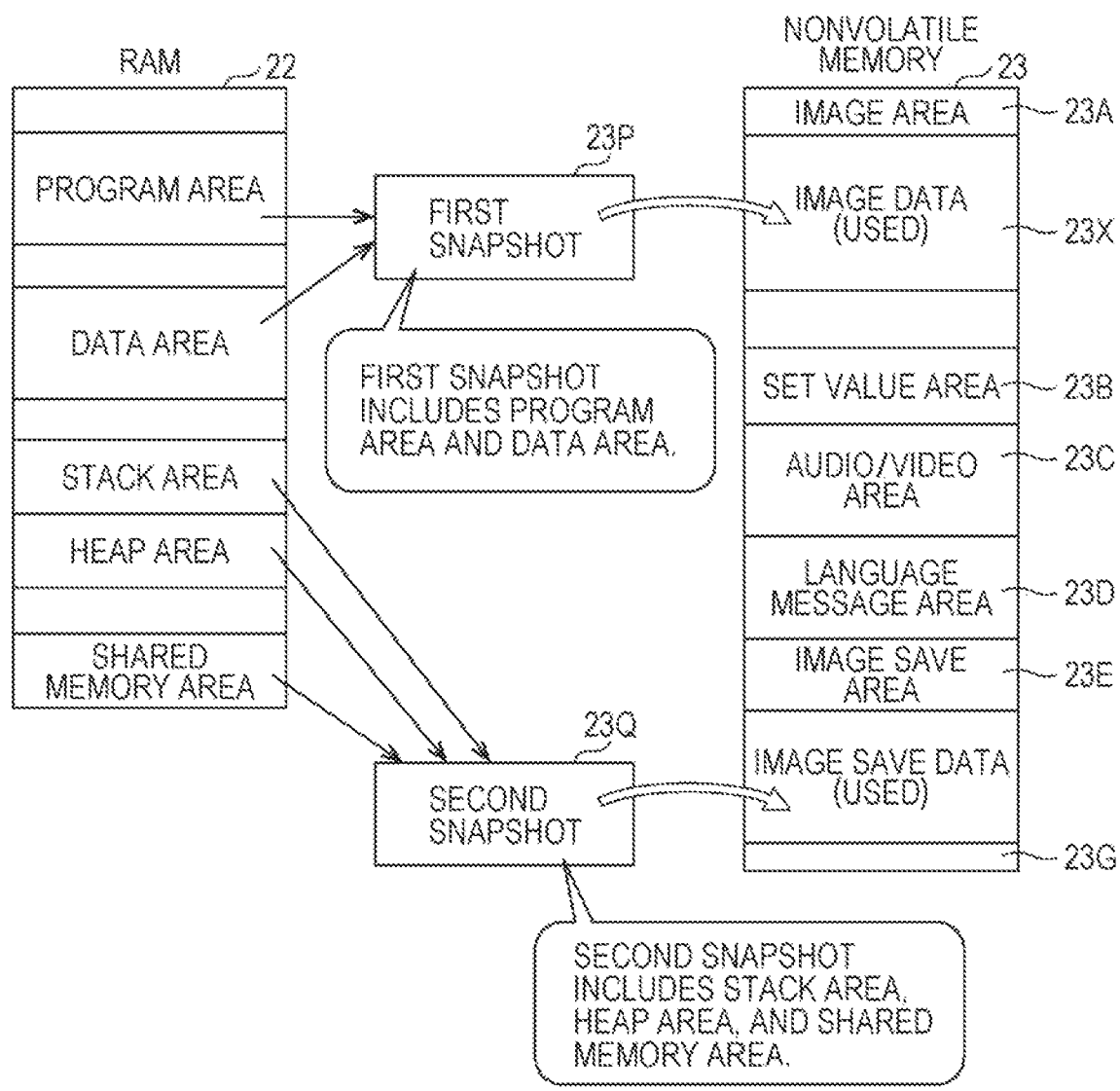
FIG. 8 is a diagram for explaining a third example of use of the storage area of the nonvolatile memory.

FIG. 8 is a diagram for explaining a third example of use of the storage area of the nonvolatile memory 23.

The CPU 20 stores a snapshot in the area 23X if there is a continuous empty area with a size equal to or larger than the size of the snapshot as the used (or unused) area 23X in the image area 23A (FIG. 7). If there is no such empty area in the area 23X, the CPU 20 may generate two or more files as a snapshot and store each of the two or more files in one of a plurality of areas in the nonvolatile memory 23. The storage of two or more files will be described with reference to FIG. 8.

In the example of FIG. 8, the image area 23A and the FW download area 23G are used for snapshot storage. More specifically, in response to generating a snapshot, the CPU 20 determines whether the size of the snapshot is equal to or less than the size of the area 23X in the image area 23A. When determining that the size of the snapshot exceeds the size of the area 23X, the CPU 20 generates two or more files for the snapshot, stores one of the two or more files in the area 23X, and stores the rest in another area in the nonvolatile memory 23.

In the example of FIG. 8, the snapshot is divided into a first snapshot 23P and a second snapshot 23Q. The CPU 20 stores the first snapshot 23P in the area 23X and stores the second snapshot 23Q in the FW download area 23G. In the example of FIG. 8, the first snapshot 23P includes data of the program area 22A and the data area 22B of the RAM 22. The second snapshot 23Q includes data of the stack area 22C, the heap area 22D, and the shared memory area 22E. It is to be noted that the area data included in each snapshot can be appropriately changed.

Instead of being generated as two or more files, a snapshot may be generated as one file and then divided into two or more files.

5. Transition from Normal Mode to Power Saving Mode

Figure 9:
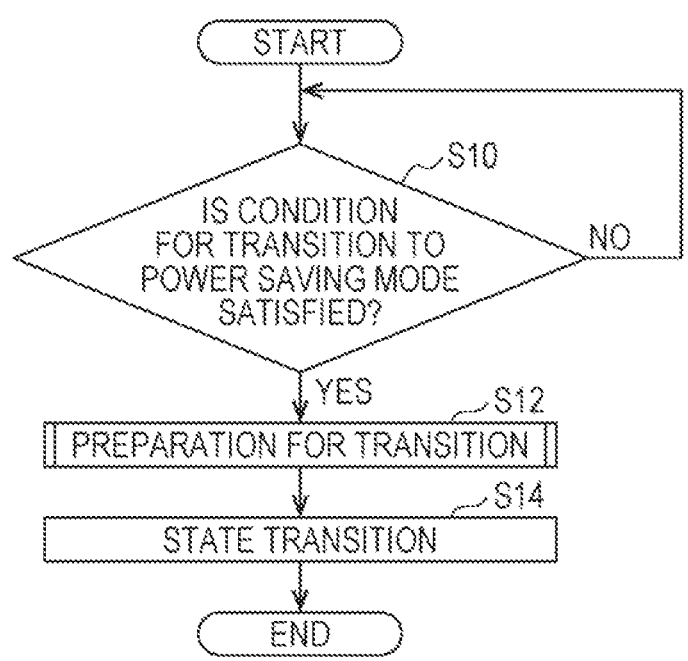
FIG. 9 is a flowchart of an example process executed by a CPU for causing the image processing apparatus to make the transition from the normal mode to the power saving mode.

FIG. 9 is a flowchart of an example process executed by the CPU 20 for causing the image processing apparatus 1 to make the transition from the normal mode to the power saving mode. The details of this process will be described, with reference to FIG. 9.

In step S10, the CPU 20 determines whether a condition for transition from the normal mode to the power saving mode is satisfied. A condition for transition to the power saving mode is an example of a condition that makes it impossible for the image processing apparatus 1 to continue the information process.

An example of a condition for transition is that the image processing apparatus 1 has remained unoperated for a certain period of time. Another example is that an operation for making the transition to the power saving mode is performed on the operation part 18. The CPU 20 repeats the control of step S10 at given intervals until it determines that a condition for transition is satisfied (NO in step S10), and if determining that a condition for transition is satisfied, advances the control to step S12 (YES in step S10).

In step S12, the CPU 20 performs a preparation for transition. The details of the preparation for transition in step S12 will be described later with reference to FIG. 12 and the like.

In step S14, the CPU 20 changes the operation state of the image processing apparatus 1 to the power saving mode. The transition to the power saving mode includes an instruction for tire sub CPU 26 to operate in the power saving mode.

6. Return from Power Saving Mode to Normal Mode

Figure 10:
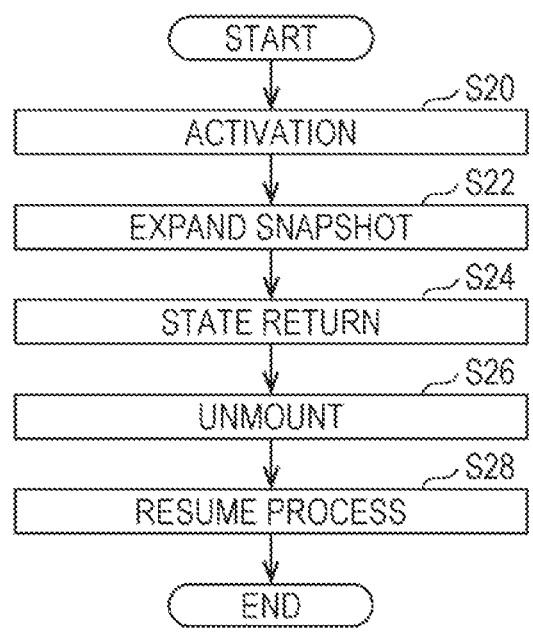
FIG. 10 is a flowchart of an example process executed for causing the image processing apparatus to return from the power saving mode to the normal mode.

FIG. 10 is a flowchart of an example process executed for causing the image processing apparatus 1 to return from the power saving mode to the normal mode. The details of this process will be described with reference to FIG. 10.

When a condition for return from the power saving mode to the normal mode is satisfied, the CPU 20 starts the process of FIG. 10. An example of a condition for return is the input of a return instruction to the operation part 18 (for example, a button operation for power-on). Another example is the reception of an instruction for return to the normal mode from the sub CPU 26. Still another example is the arrival of a predetermined time for return.

In step S20, the CPU 20 performs an activation operation (for example, reads a given program). In step S22, the CPU 20 expands, in the RAM 22, the snapshot stored in the nonvolatile memory 23. In step S24, the CPU 20 initializes each element in the image processing apparatus 1. If there is no snapshot stored in the nonvolatile memory 23, the CPU 20 skips the expansion of a snapshot or initializes the RAM 22 instead of expanding a snapshot.

In step S26, the CPU 20 unmounts the area in which the snapshot has been stored in the nonvolatile memory 23. In step S28, the CPU 20 uses the content (the value of the data area 22B, the value of the stack area 22C, etc.) expanded in the RAM 22 to resume the suspended process (image log transfer process and the like to be described later).

7. Specific Details of Preparation for Transition

Hereinafter, the specific details of the preparation for transition (step S12) in FIG. 9 will be described with reference to FIGS. 11 to 42.

<Preparation for Transition (1)>

Figure 11:
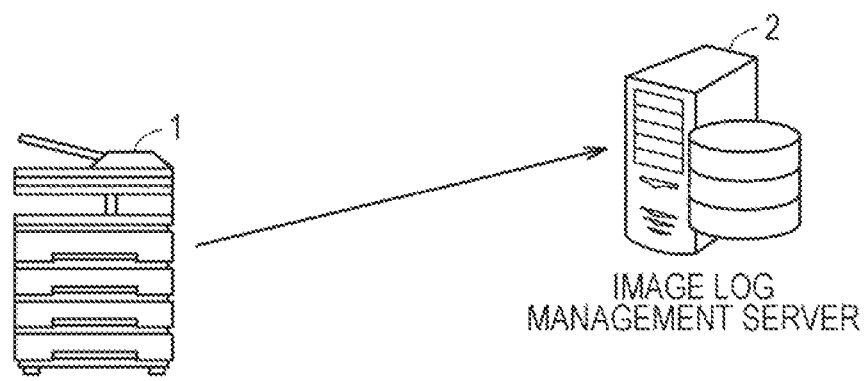
FIG. 11 is a diagram for explaining an example of an information process executed by the image processing apparatus.

FIG. 11 is a diagram for explaining an example of an information process executed by the image processing apparatus 1. FIG. 11 illustrates the image processing apparatus 1 and an image log management server 2 with which the image processing apparatus 1 communicates through the network. In the example of FIG. 11, the image processing apparatus 1 transmits an image log of a copy job to the image log management server 2 as an example of an information process. The image log is, for example, a thumbnail image of the copied image.

For example, the user operates the operation part 18 to instruct the image processing apparatus 1 to make three copies of a two-page document. In response, the CPU 20 executes the copy job. More specifically, the CPU 20 causes the scanner 12 to scan the document and stores the image data of the two pages in the image area 23A. The CPU 20 instructs the printer 13 to output the image data of the two pages three times.

When the output of the image data is completed, the CPU 20 further transmits an image log of the copy job to the image log management server 2. More specifically, the CPU 20 creates a thumbnail image from the image data of the two pages. The CPU 20 transmits the thumbnail image as an image log to the image log management server 2.

Figure 12:
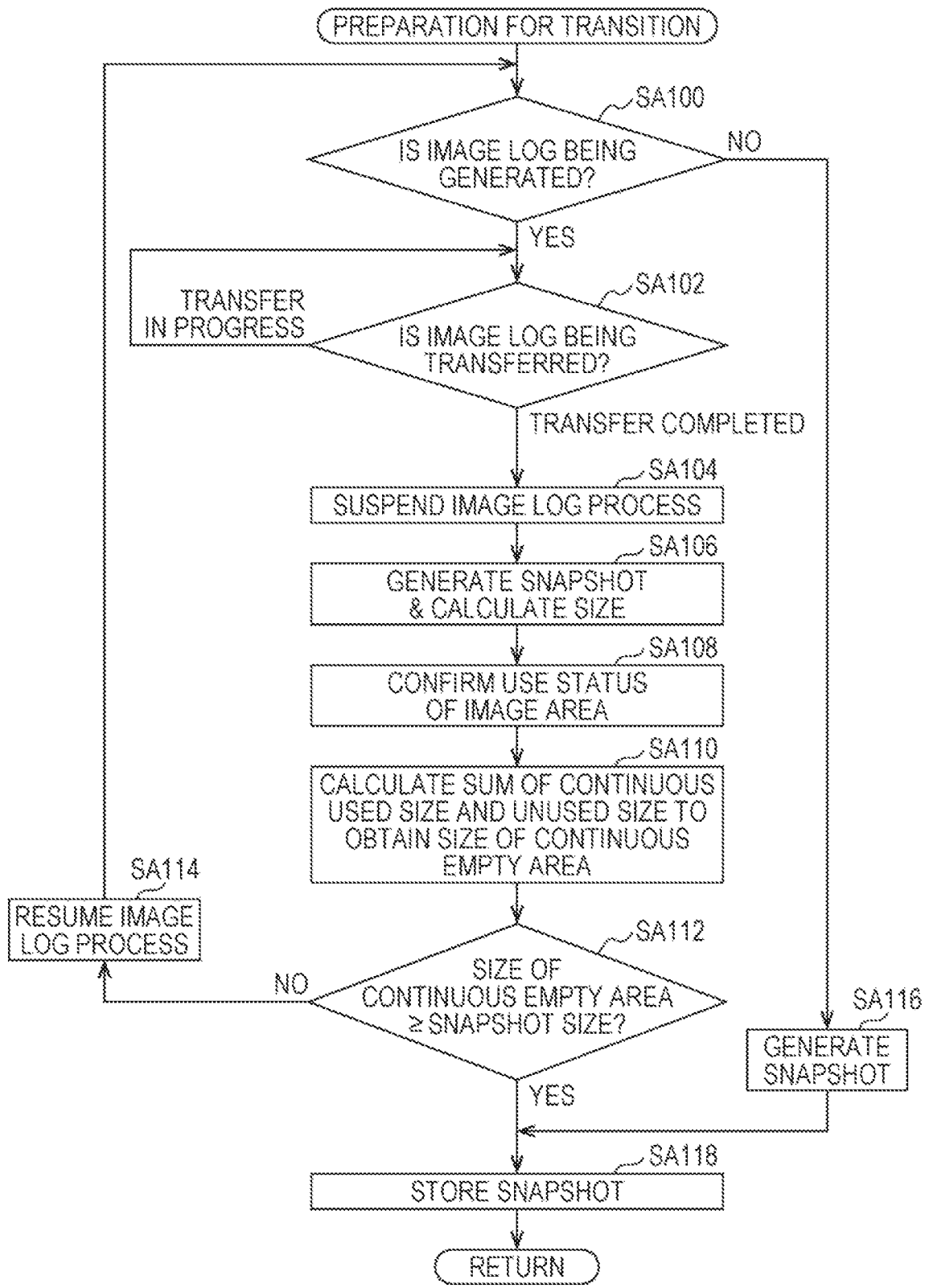
FIG. 12 is a diagram illustrating an example of a subroutine of step 412.

FIG. 12 is a diagram illustrating an example of a subroutine of step S12. In the subroutine in FIG. 12, the image area 23A is adopted as an area for snapshot storage as described with reference to FIG. 6 and the like. The details of the subroutine will be described, with reference to FIG. 12.

In step SAM), the CPU 20 determines whether the image processing apparatus 1 is executing the process for transmitting an image log (image log process). When determining that the image processing apparatus 1 is executing the image log process (YES in step SA100), the CPU 20 advances the control to step SA102. In other cases (NO in step SA100), the CPU 20 advances the control to step S116. For example, when a condition for transition to the power saving mode is satisfied during the execution of the image log process, the CPU 20 advances the control from step SA100 to step SA102.

In step SA116, the CPU 20 generates a snapshot of the RAM 22, and advances the control to step SA118.

On the other hand, in step SA102, the CPU 20 determines whether the image processing apparatus 1 is currently transmitting the generated image log to the image log management server 2. The image log process includes the generation of an image log and the transmission of time image log. When determining that the image processing apparatus 1 is transmitting the image log ("transfer in progress" in step SA102), the CPU 20 executes the control of step SA102 at given intervals until the transmission is completed. When determining that the image processing apparatus 1 is not transmitting the image log ("transfer completed" in step SA102), the CPU 20 advances the control to step SA104.

In step SA104, the CPU 20 suspends (interrupts) the process of transmitting the image log (image log process).

In step SA106, the CPU 20 generates a snapshot of the RAM 22 and calculates the size (capacity) of the snapshot.

In step SA108, the CPU 20 confirms the use status of the image area 23A of the nonvolatile memory 23.

In step SA110, the CPU 20 calculates the sum of used areas and unused areas of the image area 23A to acquire the size of a continuous empty area in the image area 23A.

In step SA112, the CPU 20 determines whether the size of time continuous empty area acquired in step SA110 is equal to or larger than time size of the snapshot. When determining that the size of the continuous empty area is equal to or larger than the size of the snapshot (YES in step SA112), the CPU 20 advances the control to step SA118. In other cases (NO in step SA112), the CPU 20 advances the control to step SA114.

In step SA114, the CPU 20 resumes the image log process and advances the control to step SA100.

In step SA118, the CPU 20 stores the snapshot in the nonvolatile memory 23 and returns the process to FIG. 9. In step SA118, the snapshot is stored, for example, in a used or unused area in the image area 23A. As described with reference to FIG. 8, the snapshot may be generated as two or more files, and each of the two or more files may be stored in one of a plurality of areas in the nonvolatile memory 23.

In the process described with reference to FIG. 12, the CPU 20 interrupts the image log process and makes the transition to the power saving mode. Upon returning to the normal mode, the CPU 20 resumes the interrupted image log process by expanding, in the RAM 22, the snapshot stored in the nonvolatile memory 23.

<Preparation for Transition (2)>

Figure 13:
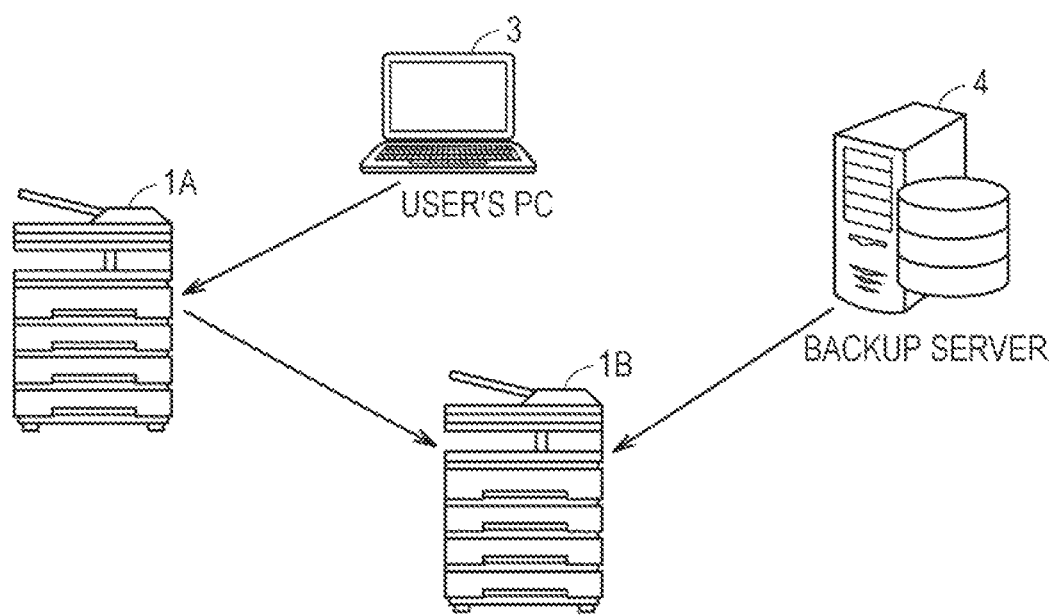
FIG. 13 is a diagram for explaining another example of an information process executed by the image processing apparatus.

FIG. 13 is a diagram for explaining another example of an information process executed by the image processing apparatus 1. In FIG. 13, a system for implementing what is called ubiquitous printing is described. The configuration of the system will be described with reference to FIG. 13.

The system includes image processing apparatuses 1A and 1B, a user's PC 3, and a backup server 4. The image processing apparatus 1A functions as a storage machine that receives an instruction from the PC 3 and stores a file (document). The image processing apparatus 1B functions as a client machine that acquires and outputs the file stored in the storage machine.

The user transmits a print job from PC 3 to the image processing apparatus 1A. The image processing apparatus 1A stores the transmitted print job in the HDD (HDD 24) in association with the user. By operating the image processing apparatus 1B, the user searches the image processing apparatus 1A for the job list associated with the user. The image processing apparatus 1B acquires the job list by communicating with the image processing apparatus 1A and displays the job list on the display 15 of the image processing apparatus 1B.

The user selects a desired job from the job list displayed on the display 15 of the image processing apparatus 1B. In response to the selection, the image processing apparatus 1B requests the image processing apparatus 1A to transfer the image data included in the desired job. In response to the request, the image processing apparatus 1A transfers the image data to the image processing apparatus 1B. The image processing apparatus 1B executes the job selected by the user by printing the image data received from the image processing apparatus 1A.

Figure 14:
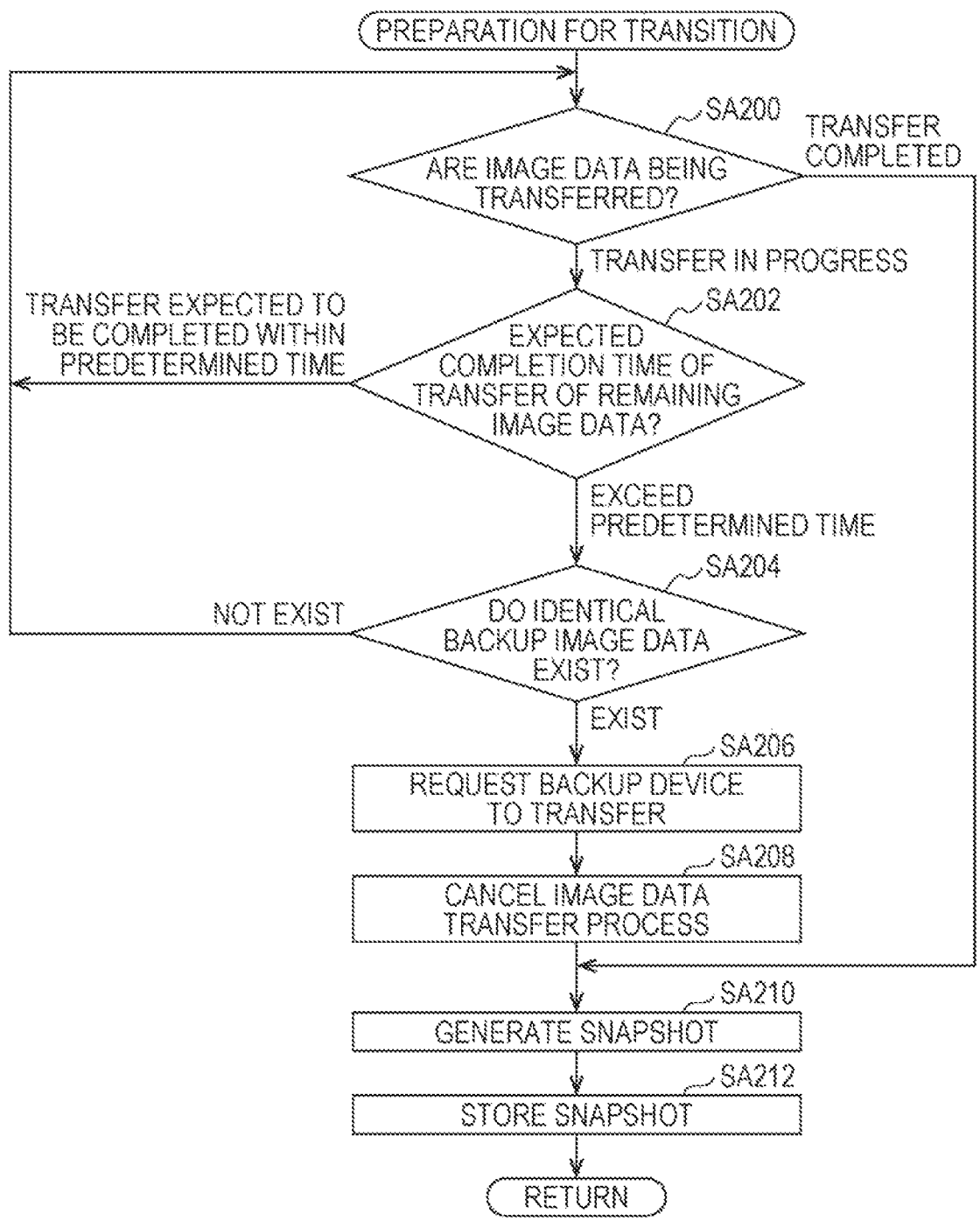
FIG. 14 is a diagram illustrating an example of a subroutine of step S12.

FIG. 14 is a diagram illustrating an example of a subroutine of step S12. FIG. 14 illustrates a process executed by the CPU 20 of the storage machine (image processing apparatus 1A) in the system illustrated in FIG. 13. As an area for snapshot storage, the subroutine in FIG. 14 may adopt the image area 23A as described with reference to FIG. 6 and the like, an area, other than the image area 23A having another use, or a snapshot dedicated area as described with reference to FIG. 5 and the like. The details of the subroutine will be described with reference to FIG. 14.

In step SA200, the CPU 20 determines whether the image processing apparatus 1A is currently transferring image data to the client machine (image processing apparatus 1B). When determining that the image processing apparatus 1A is transferring image data ("transfer in progress" in step SA200), the CPU 20 advances the control to step SA202. In other cases ("transfer completed" in step SA200), the CPU 20 advances the control to step SA210.

In step SA202, the CPU 20 calculates the expected completion time of the transfer (remaining tune of the transfer) based on, for example, the capacity of the image data being transferred, and determines whether the time exceeds a predetermined time. When determining that the time is within the predetermined time ("transfer expected to be completed within predetermined time" in step SA202), the CPU 20 returns the control to step SA200. In other cases ("exceed predetermined time" in step SA202), the CPU 20 advances the control to step SA204. As a result, when the image data transfer is expected to be completed within the predetermined time based on the remaining time, the transfer of the image data is continued.

In step SA204, the CPU 20 determines whether a backup of the image data identical to the image data to be transferred is stored in another device in the network. In one example, the server in the network distributes, to each device in advance, a list of image data stored in each device. By referring to the list, the CPU 20 implements the determination in step SA204. When determining that a backup of the image data exists in another device ("exist" in step SA204), the CPU 20 advances the control to step SA206. In other cases ("not exist" in step SA204), the CPU 20 returns the control to step SA200.

In step SA206, the CPU 20 requests the device that contains the image data to be transferred to transfer the image data to the client machine (image processing apparatus 1B).

In step SA208, the CPU 20 cancels the transfer of the image data.

In step SA210, the CPU 20 generates a snapshot of the RAM 22.

In step SA212, the CPU 20 stores the generated snapshot in the nonvolatile memory 23 and returns the process to FIG. 9.

According to the process of FIG. 14, the image processing apparatus 1 cancels the transfer of image data and generates a snapshot.

<Preparation for Transition (3)>

Figure 15:
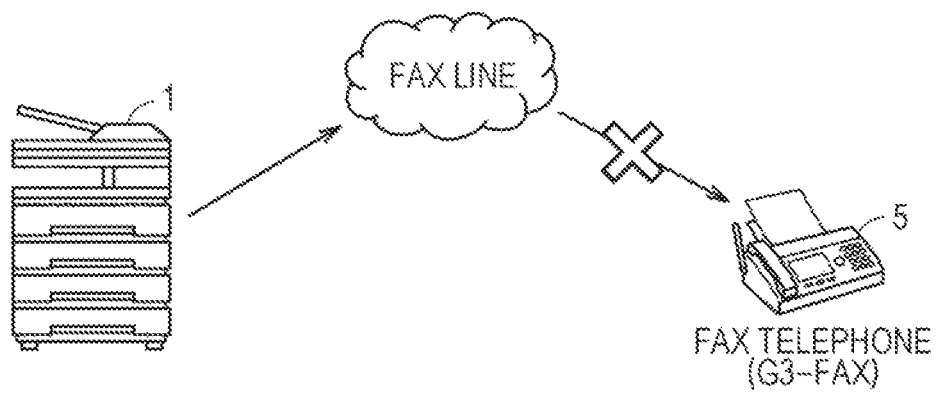
FIG. 15 is a diagram for explaining another example of an information process executed by the image processing apparatus.

FIG. 15 is a diagram for explaining another example of an information process executed by the image processing apparatus 1. FIG. 15 illustrates a communication system including the image processing apparatus 1 and a FAX telephone 5. The FAX telephone 5 is, for example, a FAX transceiver compliant with the G3_FAX standard. FIG. 15 illustrates a state in which the FAX line between the image processing apparatus 1 and the FAX telephone 5 is temporarily disconnected.

Figure 16:
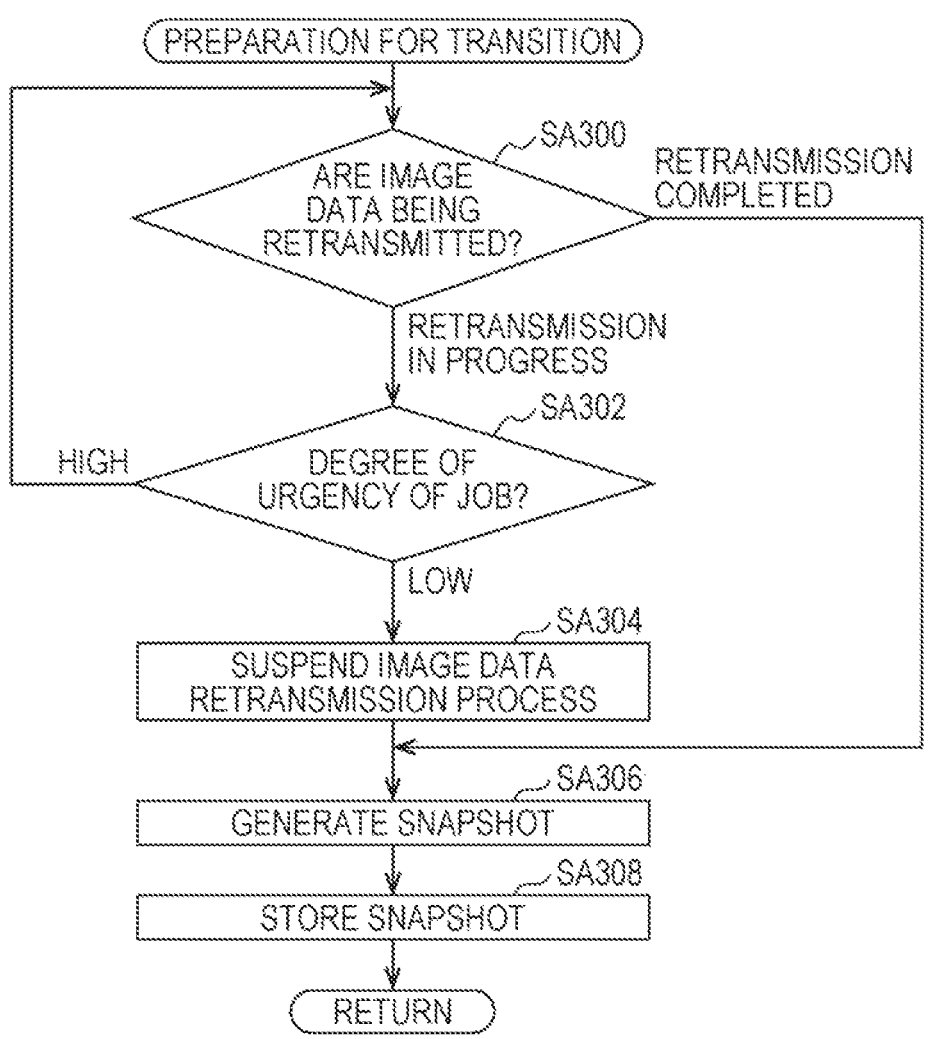
FIG. 16 is an example of a subroutine process of step S12 in FIG. 9 executed for retransmission.

As illustrated in FIG. 15, in the event that the line is disconnected when the image processing apparatus 1 tries to transmit a FAX document to the FAX telephone 5, the image processing apparatus 1 retransmits the FAX document. FIG. 16 is an example of a subroutine process of step S12 in FIG. 9 executed for the retransmission. The details of this process will be described with reference to FIG. 16.

In step SA300, the CPU 20 determines whether the image processing apparatus 1 is currently retransmitting the image data (FAX document). When determining that the FAX document is being retransmitted ("retransmission in progress" in step SA300), the CPU 20 advances the control to step SA302. In other cases ("retransmission completed" in step SA300), the CPU 20 advances the control to step SA306.

In step SA302, the CPU 20 determines whether the degree of urgency of the FAX document transmission job being executed in the image processing apparatus 1 is high or low. In one example, the CPU 20 implements the determination in step SA302 by performing optical character recognition (OCR) on the document to be transmitted as a FAX document and determining whether the character string acquired in the OCR includes a character string indicating that the degree of urgency is high. Examples of character strings indicating that the degree of urgency is high include, but are not limited to, "emergency", "urgent", "accident report", "complaint response", "delivery date", and the like. In another example, the CPU 20 implements the determination in step SA302 by determining whether the FAX number of the destination of the FAX document is registered in a given list as a predetermined emergency destination. The list is stored in the HDD 21, for example. In still another example, the CPU 20 determines the degree of urgency by combining the result of OCR and the destination. The CPU 20 may determine that the degree of urgency of the transmission job is high when the result of OCR includes any of the above character strings and the destination is in the predetermined list. In other cases, the CPU 20 may determine that the degree of urgency of the transmission job is low.

In step SA302, when determining that the degree of urgency of the FAX document transmission job is high ("high" in step SA302), the CPU 20 returns the control to step SA300. In other cases ("low" in step SA302), the CPU 20 advances the control to step SA304.

In step SA304, the CPU 20 suspends the FAX document transmission job (image data transmission process).

In step SA306, the CPU 20 generates a snapshot of the RAM 22.

In step SA308, the CPU 20 stores the generated snapshot in the nonvolatile memory 23. Thereafter, the CPU 20 returns the process to FIG. 9.

In the process of FIG. 16, the CPU 20 continues executing the fax transmission process or suspends (interrupts) the process and generates a snapshot, depending on whether the degree of importance of the FAX document transmission job being executed is high. In the example of FIG. 16, the degree of urgency is adopted as au example degree of importance. Once the snapshot is used, the FAX document transmission job is resumed from the interrupted page.

(Transmission of Document Containing Multiple Pages)

Figure 17:
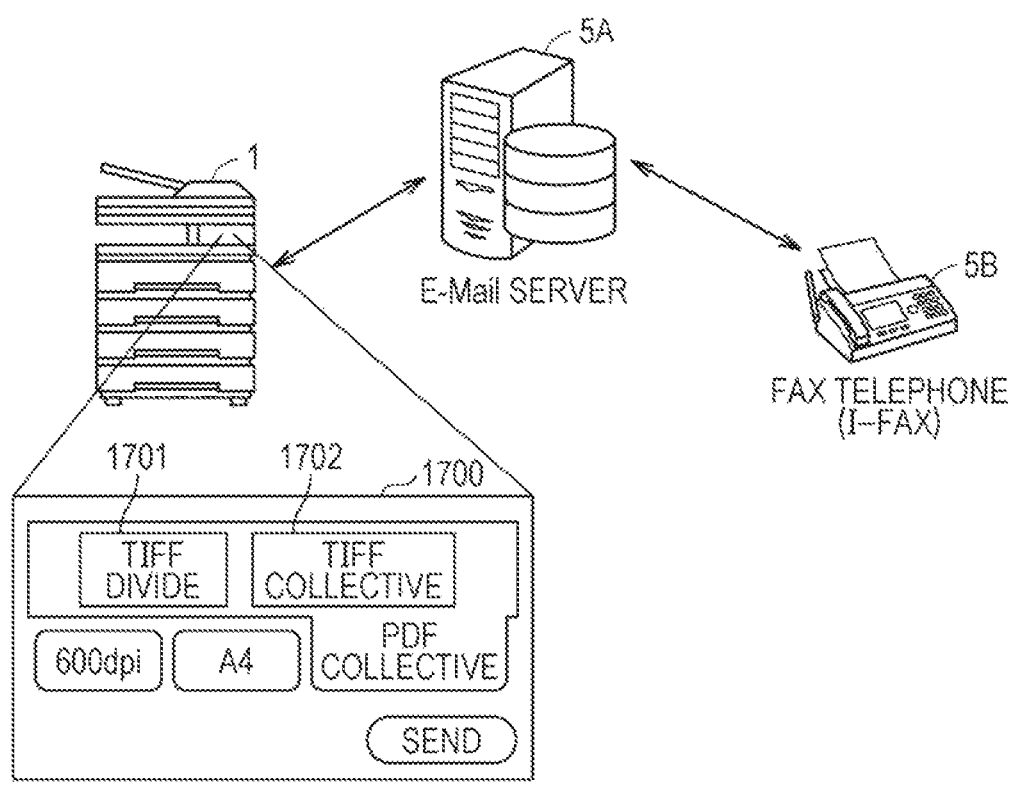
FIG. 17 is a diagram for describing an exemplary configuration of a system that transmits a message with image data by i-FAX.

The process in FIG. 16 can also be applied to the transmission of a message with image data such as Internet fax (i-FAX). FIG. 17 is a diagram for describing an exemplary configuration of a system that transmits a message with image data by i-FAX.

The system illustrated in FIG. 17 includes the image processing apparatus 1, an e-mail server 5A, and a FAX telephone 5B. The FAX telephone 5B has a function of transmitting and receiving a document via Internet communication. The image processing apparatus 1 transmits, to the e-mail server 5A, an e-mail containing a fax document as an attachment file. The e-mail server 5A transmits the received FAX document to the FAX telephone 5 through the FAX line. The FAX telephone 5B outputs the FAX document attached to the received e-mail.

In a case where the FAX document includes images of a plurality of pages, the image processing apparatus 1 accepts the setting as to whether to transmit the images of the plurality of pages as one TIFF file or as TIFF files for the respective pages. For example, the CPU 20 displays a screen 1700 on the display 15 and accepts designation from the user. The screen 1700 includes two buttons 1701 and 1702.

Figure 18:
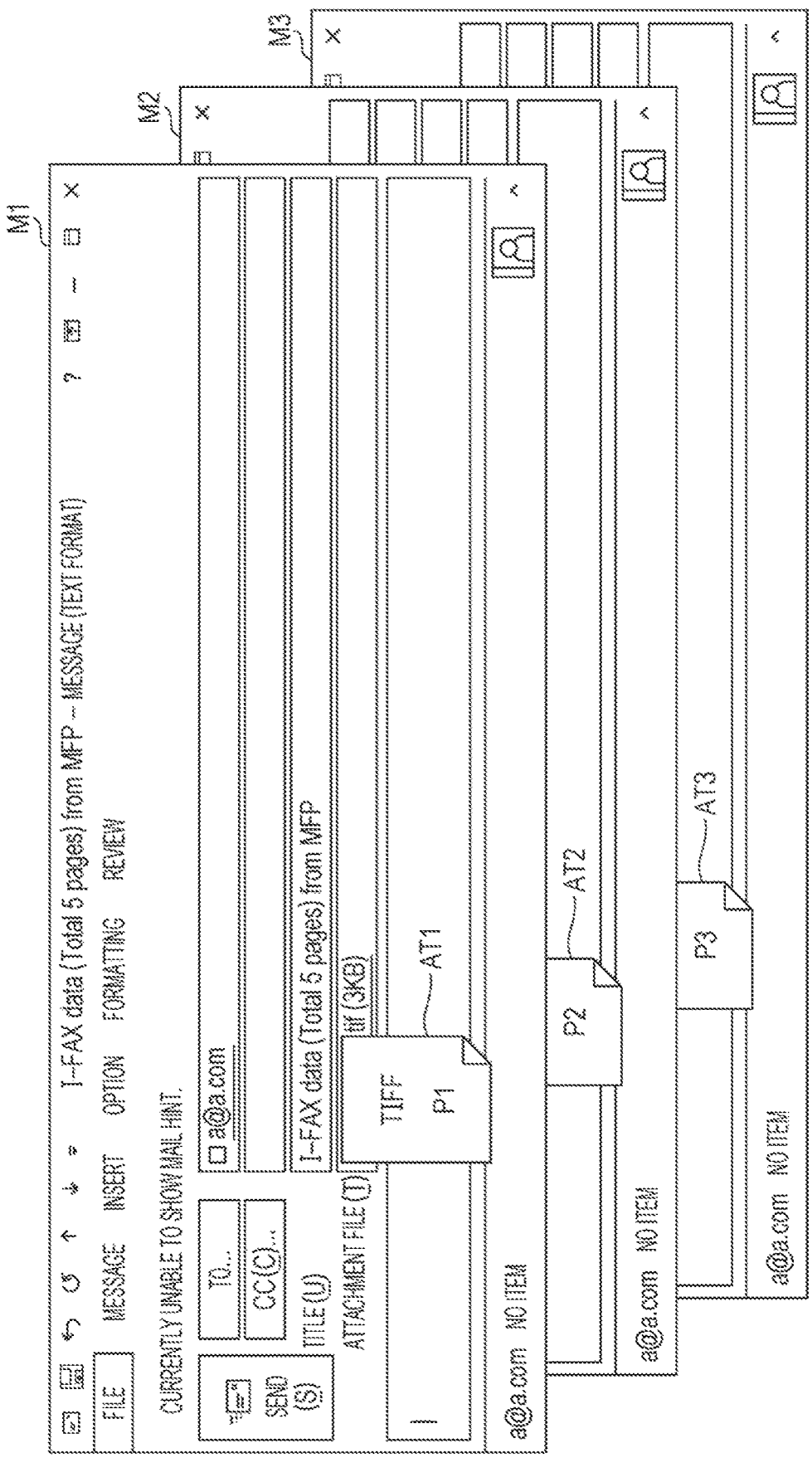
FIG. 18 is a diagram for transmitting information that each of a plurality of TIFF files is attached to one of a plurality of e-mails for transmission.

When the button 1701 is operated, a TIFF file for each page is generated, and each TIFF file is transmitted from the image processing apparatus 1 to the e-mail server 5A. FIG. 18 is a diagram for transmitting information that each of a plurality of TIFF files is attached to one of a plurality of e-mails for transmission. In FIG. 18, three TIFF files AT1, AT2, and AT3 are attached to three messages M1, M2, and M3, respectively.

Figure 19:
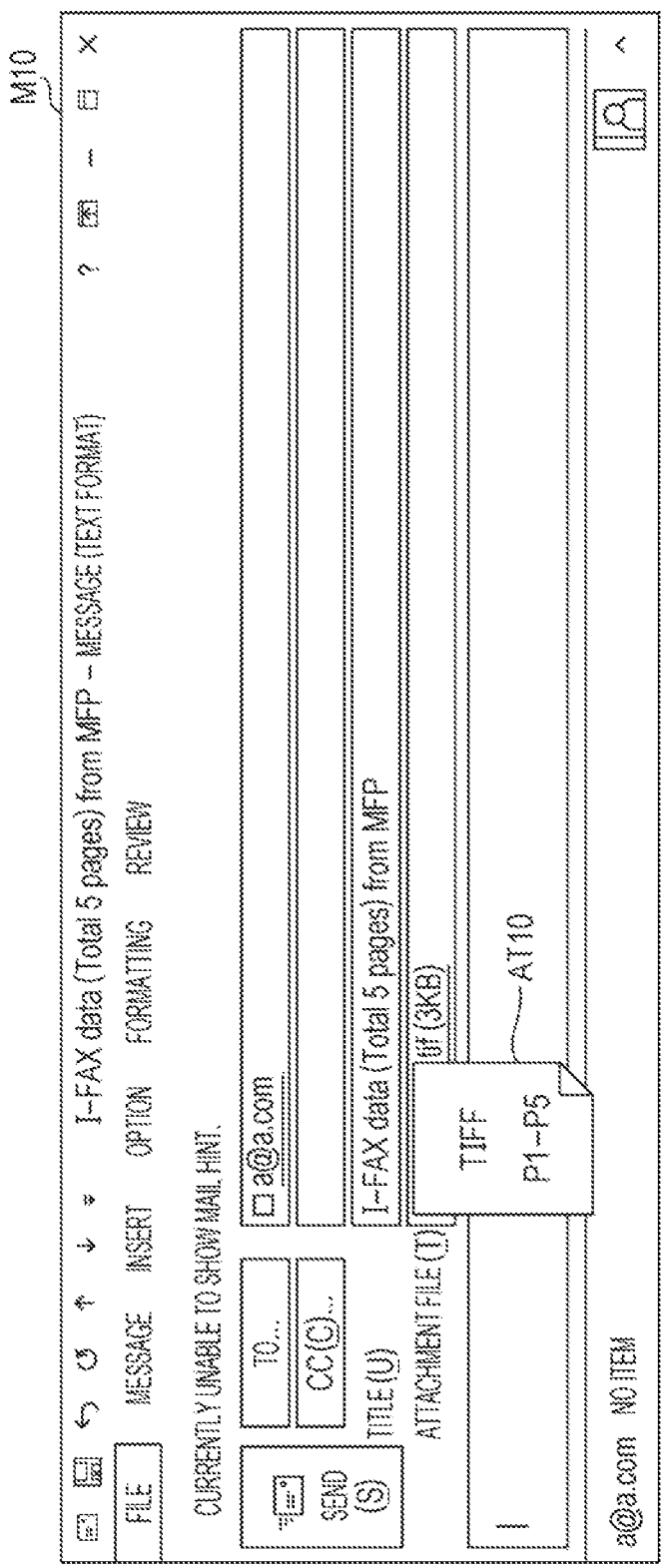
FIG. 19 is a diagram for transmitting information that one TIFF file is attached to one e-mail for transmission.

When the button 1702 is operated, one TIFF file including a plurality of images is generated, and the one TIFF file is attached to one e-mail and transmitted from the image processing apparatus 1 to the e-mail server 5A. FIG. 19 is a diagram for transmitting information that one TIFF file is attached to one e-mail for transmission. In FIG. 19, one TIFF file AT10 is attached to one message M10. The TIFF file AT10 may include images of a plurality of pages. As a result, images of a plurality of pages are collectively transmitted.

<Preparation for Transition (4)>

Figure 20:
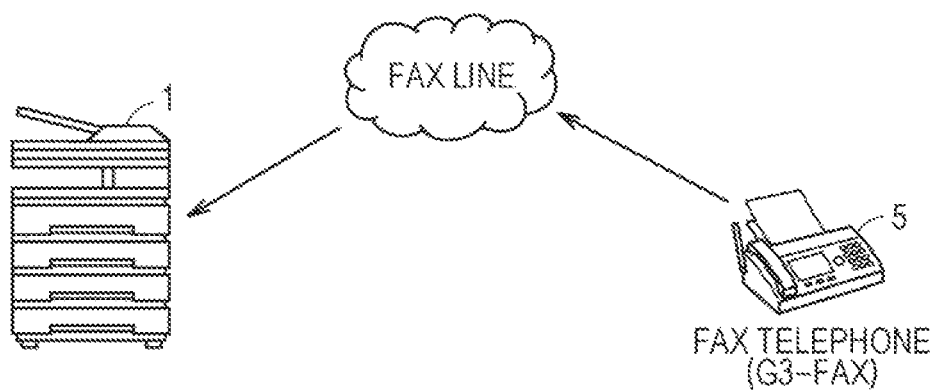
FIG. 20 is a diagram for explaining another example of an information process executed by the image processing apparatus.

FIG. 20 is a diagram for explaining another example of an information process executed by the image processing apparatus 1. The system illustrated in FIG. 20 includes the image processing apparatus t and the FAX telephone 5. The image processing apparatus 1 stores a FAX document received from the FAX telephone 5 in a special storage area set in the HDD 24. In the example of FIG. 20, an instruction to print is required for printing a received FAX document, and the FAX document is not automatically printed. The mode of receiving a FAX document at the image processing apparatus 1 in the system illustrated in FIG. 20 is also referred to as "forced memory reception".

In one example, an instruction to print a FAX document received by "forced memory reception" is input by the users operation on the operation part 18. In another example, such an instruction is input from an external device via the NIC 25. In this sense, one example of an interface that accepts input of a print instruction is the operation part 18, and another example is the NIC 25.

Figure 21:
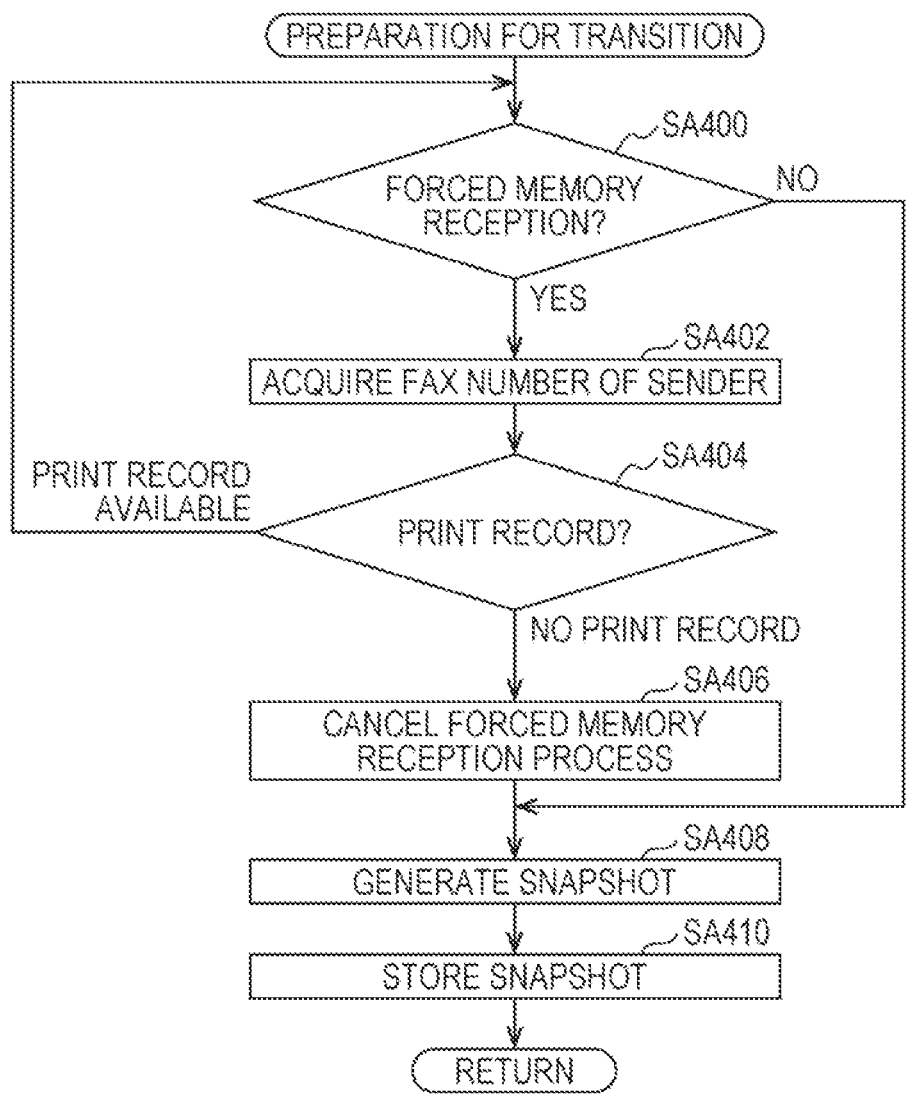
FIG. 21 is an example of a subroutine process of step 412 in FIG. 9 which is performed when a condition for transition to the power saving mode is satisfied during the execution of "forced memory reception"

FIG. 21 is an example of a subroutine process of step S12 in FIG. 9 which is performed when a condition for transition to the power saving mode is satisfied during the execution of "forced memory reception". The details of this process will be described with reference to FIG. 21.

In step SA400, the CPU 20 determines whether a FAX document is being received by "forced memory reception". When determining that a FAX document is being received by "forced memory reception" (YES in step SA400), the CPU 20 advances the control to step SA402. In other cases (NO in step SA400), the CPU 20 advances the control to step SA408.

In step SA402, the CPU 20 acquires the FAX number of the sender of the FAX document. In step SA404, by referring to the print history in the image processing apparatus 1, the CPU 20 determines whether there is an input record of an instruction for the printer 13 to print a FAX document received before from the FAX number acquired in step SA402. When determining that there is such a record ("print record available in step SA404), the CPU 20 returns the control to step SA400. When determining that there is no such record ("no print record" in step SA404), the CPU 20 advances the control to step SA406.

In step SA406, the CPU 20 cancels the process of receiving the FAX document.

In step SA408, the CPU 20 generates a snapshot of the RAM 22.

In step SA410, the CPU 20 stores the generated snapshot in the nonvolatile memory 23.

In the process of FIG. 21, if a FAX document is being received from a sender having a print record, the CPU 20 generates a snapshot after the reception of the FAX document is completed. If a FAX document is being received from a sender that has no print record, the CPU 20 can the reception of the FAX document and generates a snapshot. As a result, after the state return in step S24 (FIG. 10), the process of receiving the FAX document is not resumed.

<Preparation for Transition (5)>

Figure 22:
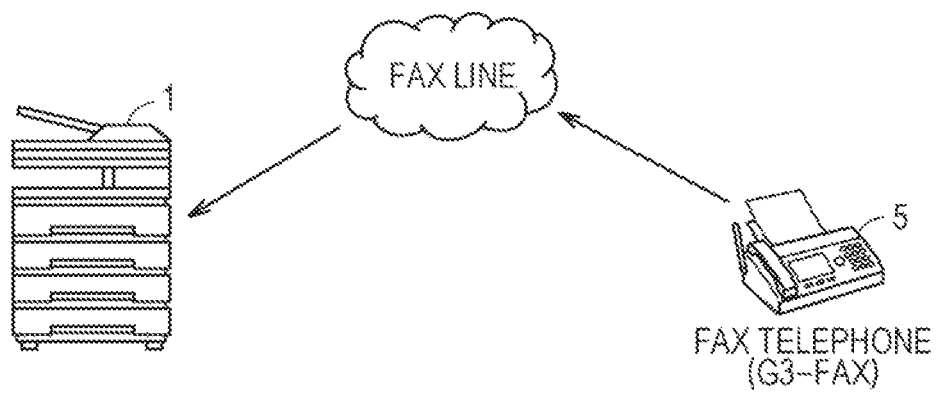
FIG. 22 is a diagram for explaining another example of an information process executed by the image processing apparatus.

FIG. 22 is a diagram for explaining another example of an information process executed by the image processing apparatus 1. The system illustrated in FIG. 22 includes the image processing apparatus 1 having a TSI allocation function and the FAX telephone 5. The "TSI allocation function" is a function of automatically allocating documents received by senders' FAXIDs (TSI) to destinations registered for the respective senders' IDs. Examples of registered destinations include a predetermined storage location (box) in the HDD 24, an electronic mail address, an FTP destination, an SMB destination, a WebDAV destination, and the like.

Figure 23:
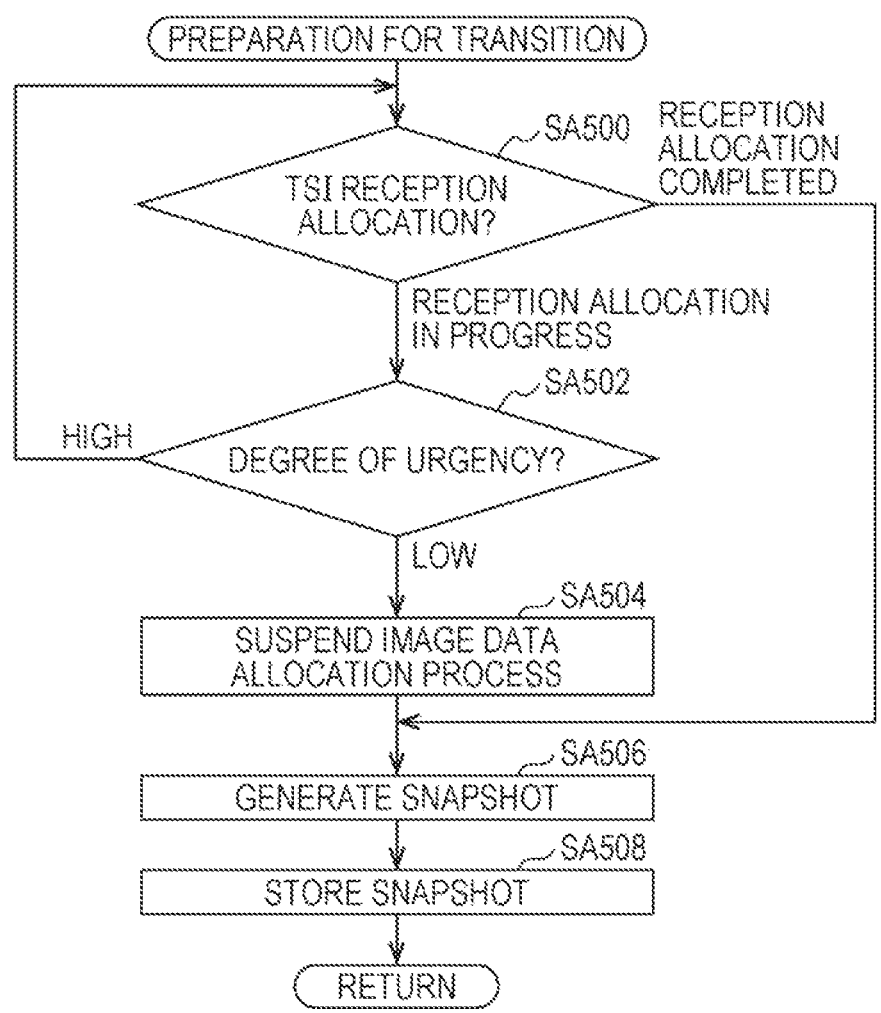
FIG. 23 is a diagram illustrating an example of a subroutine process of step S12 in FIG. 9.

FIG. 23 is a diagram illustrating an example of a subroutine process of step S12 in FIG. 9. The process in FIG. 23 is executed, for example, when a condition for transition to the power saving mode is satisfied during the execution of the process by the TSI allocation function. The details of this process will be described with reference to FIG. 23.

In step SA500, the CPU 20 determines whether the transfer of a FAX document by the TSI allocation function has been completed. If the transfer has been completed ("reception allocation completed" in step SA500), the CPU 20 advances the control to step SA506. If the transfer has not been completed yet ("reception allocation in progress" in step SA500), the CPU 20 advances the control to step SA502.

In step SA502, the CPU 20 determines whether the untransferred FAX document includes a document with a high degree of urgency. In one example, if a character string indicating that the degree of urgency is high is detected by OCR for the FAX document, the CPU 20 determines that the FAX document is a document with a high degree of urgency. In another example, if the sender of the FAX document is a predetermined destination, the CPU 20 determines that the FAX document is a document with a high degree of urgency. When determining that the untransferred FAX document includes a document with a high degree of urgency ("high" in step SA502), the CPU 20 returns the control to step SA500. In other cases ("low" in step SA502), the CPU 20 advances the control to step SA504.

In step SA504, the CPU 20 suspends the process by the TSI allocation function.

In step SA506, the CPU 20 generates a snapshot of the RAM 22.

In step SA508, the CPU 20 stores the generated snapshot in the nonvolatile memory 23. Thereafter, the CPU 20 returns the process to FIG. 9.

In the process of FIG. 23, the CPU 20 continues executing the process for the TSI allocation function or suspends (interrupts) the process and generates a snapshot, depending on whether the degree of importance of the untransferred FAX document is high. In the example of FIG. 23, the degree of urgency is adopted as an example degree of importance. Once the snapshot is used, transfer (transmission) of the untransferred FAX document is resumed in the TSI allocation function.

<Preparation for Transition (6)>

Figures 24, 25:
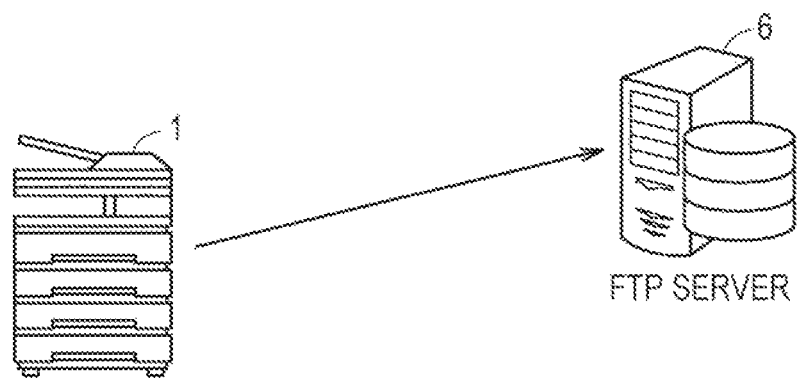
FIG. 24 is a diagram for explaining another example of an information process executed by the image processing apparatus.
FIG. 25 is a record of a virus scan log in an HDD.

FIG. 24 is a diagram for explaining another example of an information process executed by the image processing apparatus 1. The system illustrated in FIG. 24 includes the image processing apparatus 1 and a file transfer protocol (FTP) server 6. In the example of FIG. 24, before transmitting a file (for example, image data) in the HDD 24 to the FTP server 6, the image processing apparatus 1 executes a virus scan of the file in the HDD 24. It should be noted that the image processing apparatus 1 is designed to skip the virus scan if a predetermined period (e.g., one year) has not passed since the last virus scan.

FIG. 25 is a record of a virus scan log in the TIDE) 24. The record is stored in the HDD 24, for example. In FIG. 25, "Box 1", "Box 2", "Box 3", and the like are illustrated as files storage areas in the HDD 21. More specifically, the record of FIG. 25 shows that the virus scan on "Job 3" (file generated or received by Job 3) in "Box 3" was executed on Nov. 28, 2015, the virus scan on "Job 2" (file generated or received by Job 2) in "Box 2 was executed on Nov. 28, 2016, and "Job 1" (file generated or received by Job 1) in "Box 1" was executed on Nov. 28, 2017.

When transmitting the file of "job 1" to the FTP server 6 on Apr. 1, 2018, the CPU 20 transmits the file without executing the virus scan as one year has not passed since the virus scan on the file of "Job 1".

When transmitting the file of "Job 2" to the FTP server 6 on Apr. 1, 2018, as one year has passed since the virus scan on the file of "Job 2", the CPU 20 executes the virus scan. If there is no virus detected, the CPU 20 is allowed to transmit the file.

Figure 26:
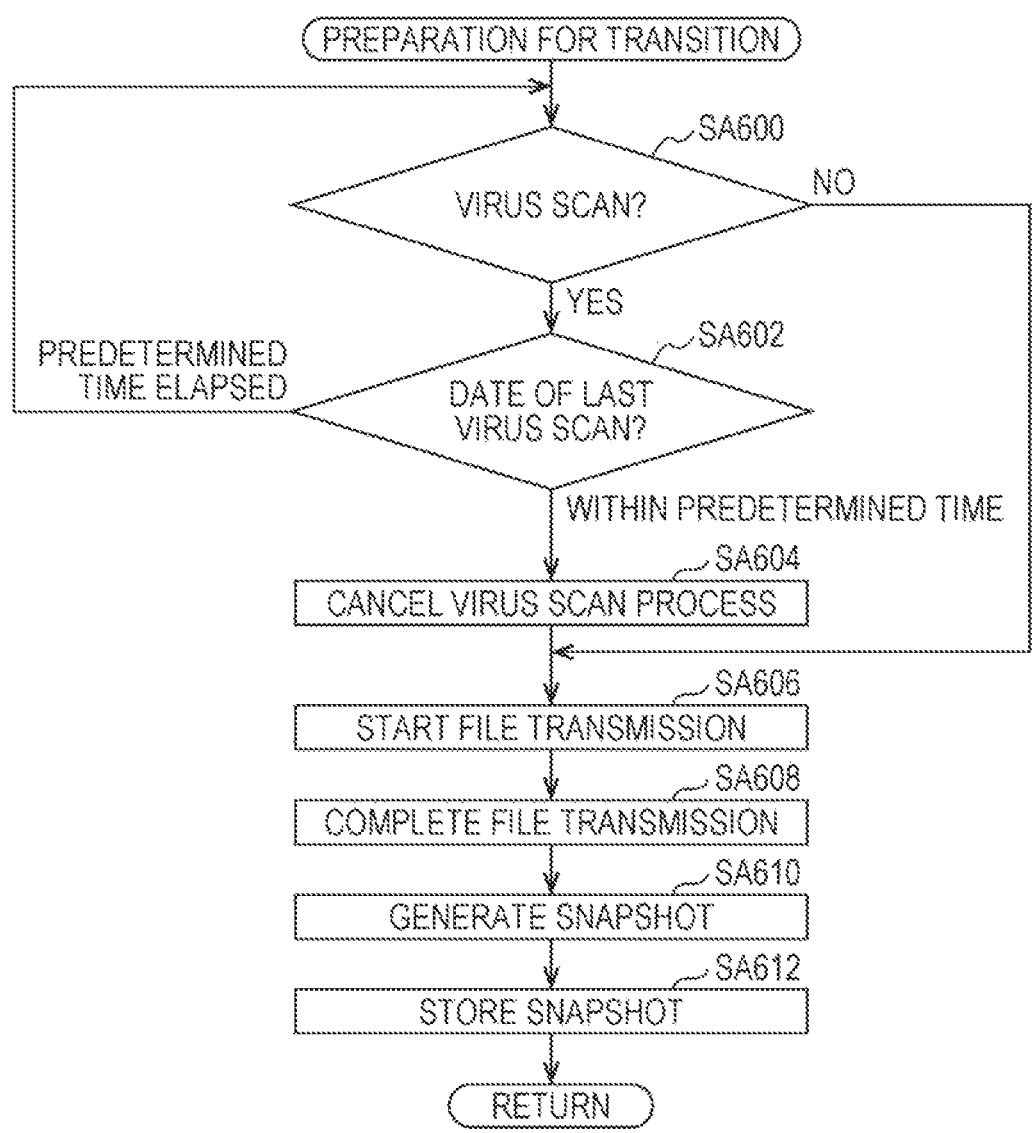
FIG. 26 is a diagram illustrating an example of a subroutine process of step S12 in FIG. 9.

FIG. 26 is a diagram illustrating an example of a subroutine process of step S12 in FIG. 9. The details of this process will be described with reference to FIG. 26.

In step SA600, the CPU 20 determines whether the image processing apparatus 1 is executing a virus scan of the file to be transmitted to the FTP server 6. When determining that the file is being scanned for viruses (YES in step SA600), the CPU 20 advances the control to step SA602. In other cases (NO in step SA600), the CPU 20 advances the control to step SA606.

In step SA602, the CPU 20 determines whether one year has passed since the date of the last virus scan on the file. If one year has passed ("predetermined time elapsed" in step SA602), the CPU 20 returns the control to step SA600. In other cases "within predetermined time" in step SA602), the CPU 20 advances the control to step SA606.

In step SA604, the CPU 20 cancels the virus scan of the file.

In step SA606, the CPU 20 transmits the file to the FTP server 6.

In step SA608, the CPU 20 waits for completion of the transmission of the file to the FTP server 6, and advances the control to step SA610 after completion.

In step SA610, the CPU 20 generates a snapshot of the RAM 22.

In step SA612, the CPU 20 stores the generated snapshot in the nonvolatile memory 23. Thereafter, the CPU 20 returns the process to FIG. 9.

<Preparation for Transition (7)>

Figure 27:
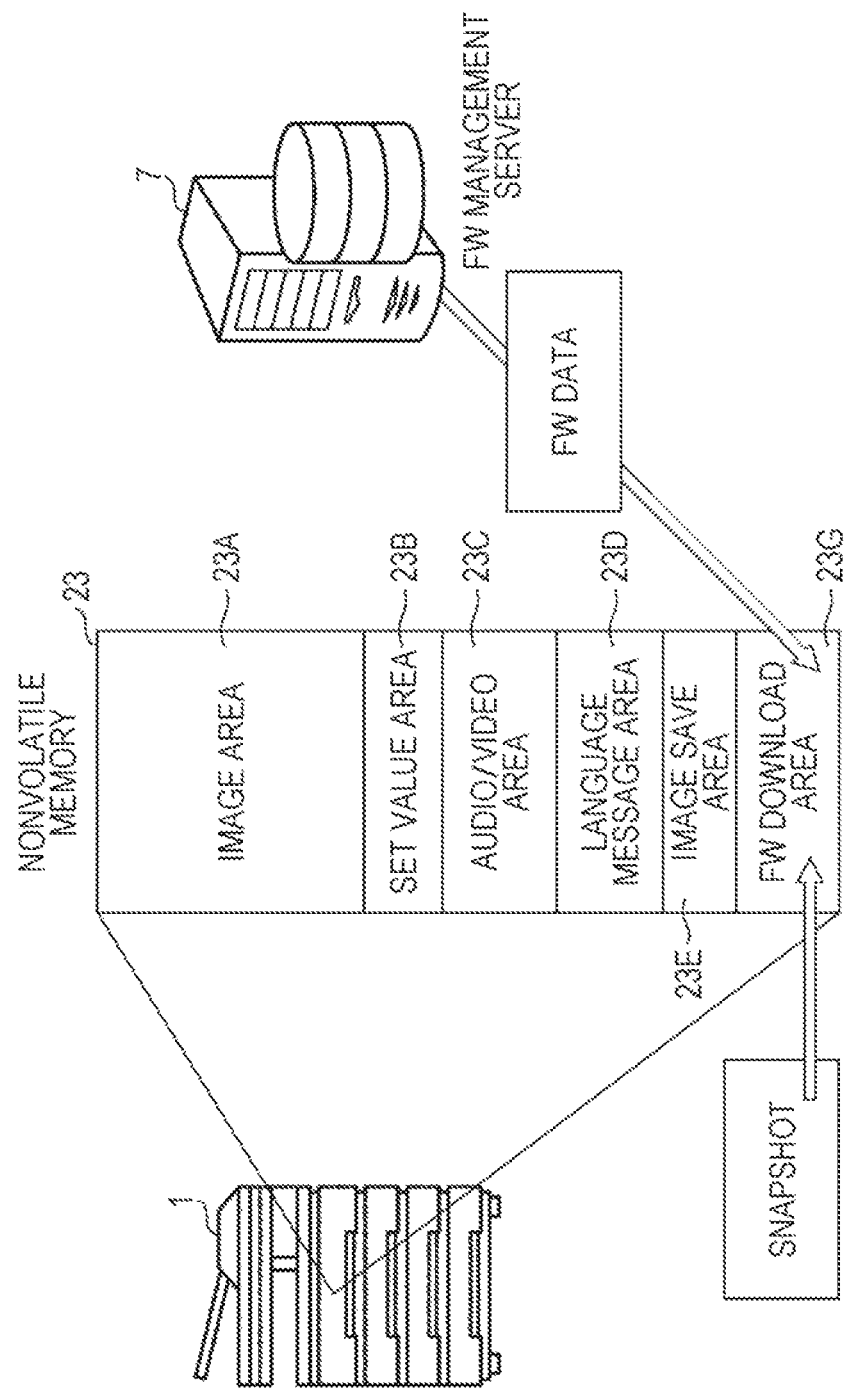
FIG. 27 is a diagram for explaining another example of an information process executed by the image processing apparatus.

FIG. 27 is a diagram for explaining another example of an information process executed by the image processing apparatus 1. In the information process of FIG. 27, the CPU 20 downloads FW to the FW download area 23G of the nonvolatile memory 23. In one example, FW is downloaded from an FW management server 7. In another example, FW is downloaded from a universal serial bus (USE) memory connected to the image processing apparatus 1.

The CPU 20 temporarily stores the downloaded FW in the FW download area 23G. After the download is completed, the CPU 20 saves the FW in the HDD 24. In the example of FIG. 27, as will be described with reference to FIG. 28, after the FW stored in the FW download area 23G is saved in the HDD 24 or if the FW download area 23G is not used, a snapshot of the RAM 22 is saved in the FW download area 23G.

Figure 28:
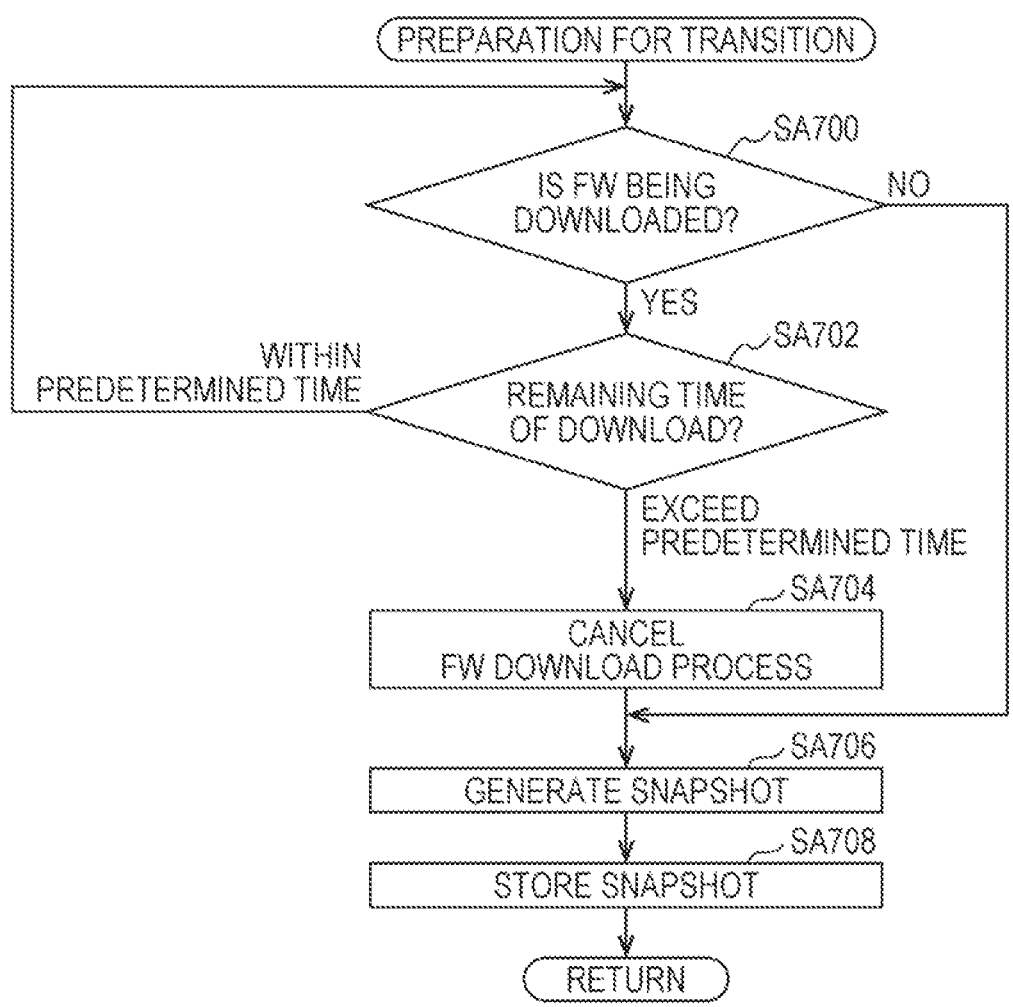
FIG. 28 is a diagram illustrating an example of a subroutine process of step S12 in FIG. 9.

FIG. 28 is a diagram illustrating an example of a subroutine process of step S12 in FIG. 9. The process in FIG. 28 is executed when a condition for transition to the power saving mode is satisfied while FW is being downloaded. The details of this process will be described with reference to FIG. 28.

In step SA700, the CPU 20 determines whether the image processing apparatus 1 is downloading FW. When determining that FW is being downloaded (YES in step SA700), the CPU 20 advances the control to step SA702. In other cases (NO in step SA700), the CPU 20 advances the control to step SA706.

In step SA702, the CPU 20 determines whether the remaining time of the FW download is within a predetermined time determined in advance. When determining that the remaining time is within the predetermined time ("within predetermined time" in step SA702), the CPU 20 returns the control to step SA700. In other cases ("exceed predetermined time" in step SA702), the CPU 20 advances the control to step SA704.

In step SA704, the CPU 20 cancels the FW download process. At this time, the CPU 20 may display, on the display 15, a message indicating that the FW download has been canceled.

In step SA706, the CPU 20 generates a snapshot of the RAM 22.

In step SA708, the CPU 20 stores the generated snapshot in the nonvolatile memory 23 (FW download area 23G). When FW is being downloaded, the CPU 20 saves the downloaded FW in the HDD 24, and then stores the snapshot in the FW download area 23G. Thereafter, the CPU 20 returns the process to FIG. 9.

In the process of FIG. 28 described above, when a condition for transition to the power saving mode is satisfied while FW is being download, the CPU 20 continues the download if the remaining time of the download is within the predetermined time, and cancels the download if the remaining time exceeds the predetermined time.

<Preparation for Transition (8)>

Figure 29:
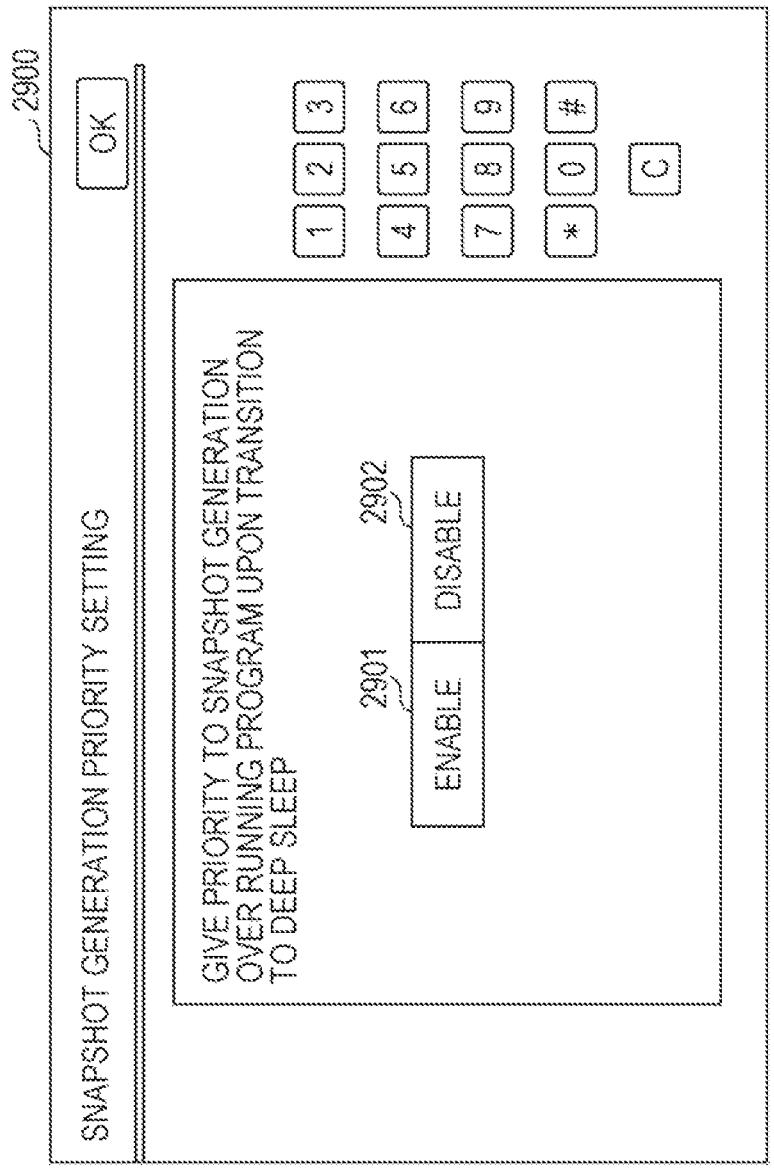
FIG. 29 is a diagram illustrating an example of a screen for accepting the setting of the priority order between information process continuation and snapshot generation.

FIG. 29 is a diagram illustrating an example of a screen for accepting the setting of the priority order between information process continuation and snapshot generation. A screen 2900 in FIG. 29 is an example of a screen displayed on the display 15 and includes buttons 2901 and 2902 for inputting the setting of the priority order to be applied when a condition for transition to the power saving mode is satisfied during the execution of an information process.

The button 2901 is used for giving priority to snapshot generation. After the button 2901 is operated for an information process, if a condition for transition to the power saving mode is satisfied during the execution of the information process, the information process is suspended, and a snapshot is generated. As a result, the time from the establishment of the condition for transition to the power saving mode to the transition to the power saving mode is shortened.

The button 2902 is used for giving priority to information process continuation. After the button 2902 is operated for an information process, if a condition for transition to the power saving, mode is satisfied during the execution of the information process, a snapshot is generated after the information process is finished. As a result, the information process is executed without being interrupted even when the condition for transition to the power saving mode is satisfied.

As described above, the setting for giving priority to snapshot generation enables the image processing apparatus 1 to make the transition to the power saving mode earlier than the setting for giving priority to information process continuation. Therefore, it can be said that the setting for giving priority to snapshot generation increases the power saving performance.

The image processing apparatus 1 accepts the setting of the priority order as illustrated in FIG. 29 for each information process. More specifically, for example, the CPU 20 displays, on a setting screen, a list of information processes such as the image log process (FIG. 12), the forced memory reception process (FIG. 20), and the process by the TSI allocation function (FIG. 23). When the user selects an information process from the list, the CPU 20 displays the screen 2900 associated with the selected information process and accepts the input for setting the priority order.

Figure 30:
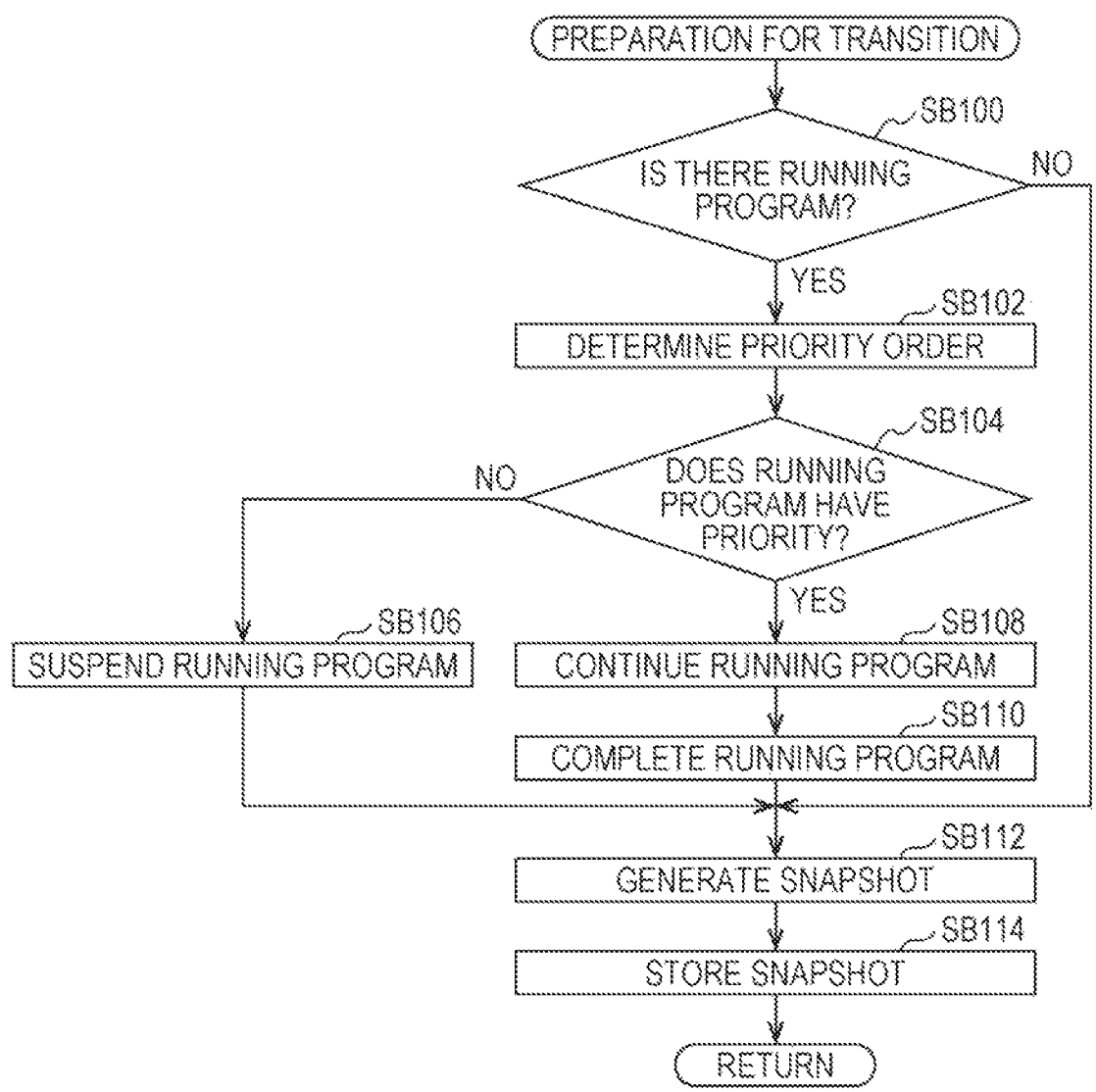
FIG. 30 is a diagram illustrating an example of a subroutine process of step S12 in FIG. 9.

FIG. 30 is a diagram illustrating an example of a subroutine process of step S12 in FIG. 9. The details of this process will be described with reference to FIG. 30.

In step SB100, the CPU 20 determines whether there is a running program (information process). When determining that there is a rimming program (YES in step SB100), the CPU 20 advances the control to step SB102. In other cases (NO in step SB100), the CPU 20 advances the control to step SB112.

In step SB102, the CPU 20 acquires the setting of the priority order relating to the miming program. The setting of the priority order is preset on the screen as explained with reference to FIG. 29. The contents of the setting are stored in the HDD 24, for example.

In step SB104, the CPU 20 determines, based on the setting, whether the running program has priority over snapshot generation. When determining that the running program has priority based on the setting (YES in step SB104), the CPU 20 advances the control to step SB108. In other cases (NO in step SB104), the CPU 20 advances the control to step SB106.

In step SB106, the CPU 20 suspends the running program. For example, if the running program is the image log process (FIG. 12), the CPU 20 suspends the image log process.

In step SB108, the CPU 20 continues the running program, and upon completion of the program being detected in step SB110, the CPU 20 advances the control to step SB112.

In step SB112, the CPU 20 generates a snapshot of the RAM 22.

In step SB114, the CPU 20 stores the generated snapshot in the nonvolatile memory 23. Thereafter, the CPU 20 returns the process to FIG. 9.

<Preparation for Transition (9)>

Figure 31:
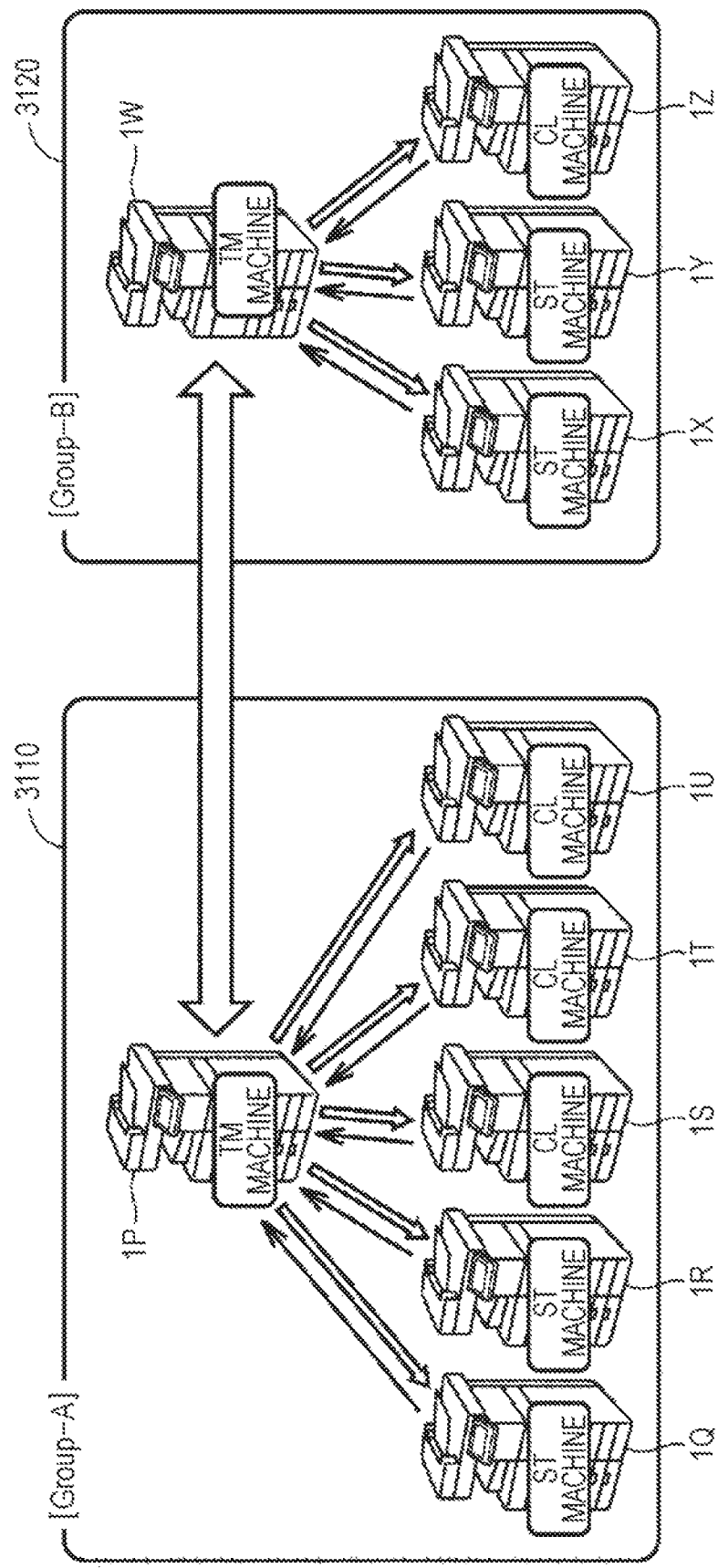
FIG. 31 is a diagram illustrating an exemplary configuration of a system that implements ubiquitous printing.

Information processes executed by the image processing apparatus 1 include a process executed in a system that implements ubiquitous printing. FIG. 31 is a diagram illustrating an exemplary configuration of a system that implements ubiquitous printing.

The system illustrated in FIG. 31 includes a group 3110 (Group-A) and a group 3120 (Group-B). The system illustrated in FIG. 31 includes topology manager machines (TM machines), which are not included in the system illustrated in FIG. 13, in addition to storage machines (ST machines) and client machines (CL machines). One TM machine is set for each group to manage the configuration of each group and notify the TM machine of the other group of the configuration in the group to which the TM machine belongs.

The group 3110 includes an image processing apparatus 1P as a TM machine, image processing apparatuses 1Q and 1R as ST machines, and image processing apparatuses 1S, 1T, and 1U as CL machines. The group 3120 includes an image processing apparatus 1W as a TM machine, image processing apparatuses 1X and 1Y as ST machines, and a image processing apparatus 1Z as a CL machine.

FIG. 32 is an example of information representing the configuration of each group. A list 3200 in FIG. 32 includes IP addresses and types (TM machine, ST machine, and CL machine) of image processing apparatuses that belong to each of Groups-A and B.

In the system of FIG. 31, an image processing apparatus acquires a list of files stored in each image processing apparatus of the group to which the image processing apparatus belongs, and displays the list of files on the display 15. In one example, a TM machine acquires, from each image processing apparatus of the group to which the TM machine belongs, a list of files stored in the image processing apparatus. The TM machine delivers the list of files to all the image processing apparatuses in the group to which the TM machine belongs. For example, the image processing apparatus 1S that belongs to Group-A displays, on the display 15 of the image processing apparatus 1S, a list of files stored in all the image processing apparatuses 1P, 1Q, 1R, 1S, 1T, 1U that belong to Group-A.

Figure 33:
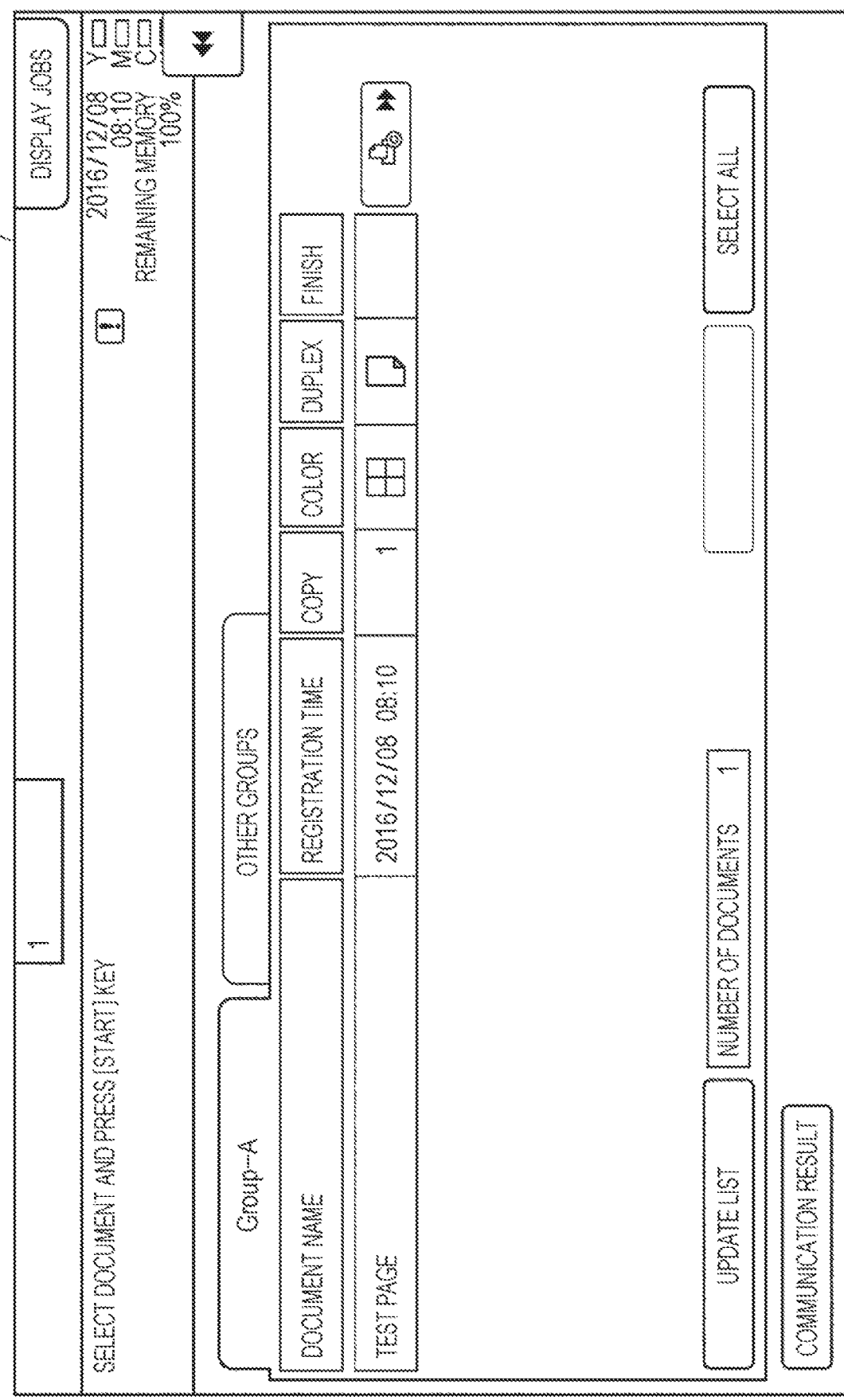
FIG. 33 is a diagram illustrating a display example of a list of files.

FIG. 33 is a diagram illustrating a display example of a list of files. The list of files displayed on a screen 3300 in FIG. 33 includes the file name "test page".

Figure 34:
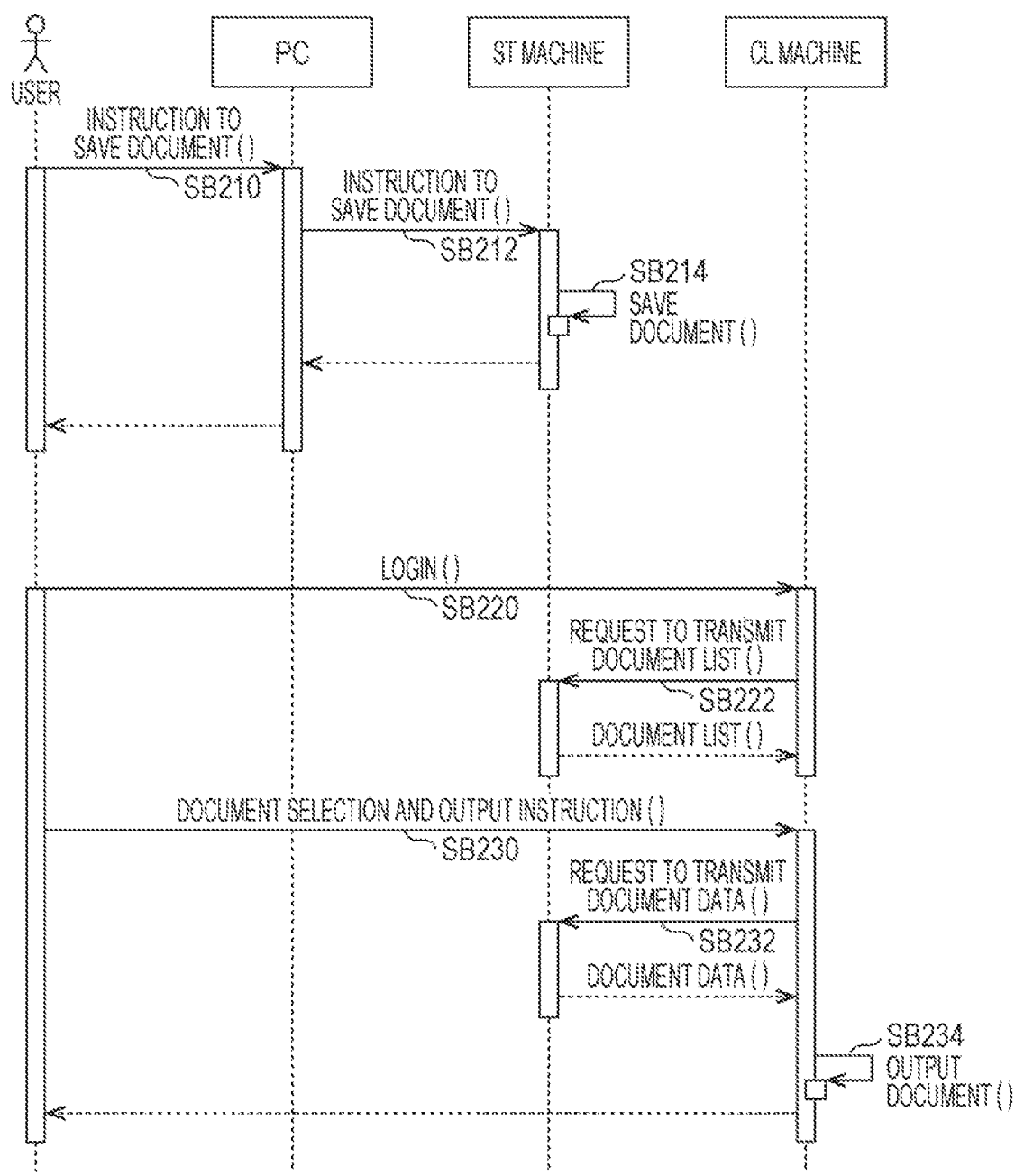
FIG. 34 is a diagram illustrating an example of a file (document) output flow in the ubiquitous printing system illustrated in FIG. 31.

FIG. 34 is a diagram illustrating an example of a file (document) output flow in the ubiquitous printing system illustrated in FIG. 31. The user logs in to the ST machine using the PC and instructs the ST machine to save the document (steps SB210 and SB212). In response, the ST machine stores the document in the ST machine (step SB214).

Thereafter, the user logs into the CL machine in order to output the document from the CL machine (step SB220). The CL machine requests a list of documents from the ST machine (step SB222). In response, the ST machine transmits the list of documents to the CL machine. The CL machine displays the list obtained from the ST machine.

The user selects the document from the list displayed on the CL machine and instructs the CL machine to output the document (step SB230). In response, the CL machine requests the ST machine to transmit the selected document (step SB232). In response, the ST machine transmits the document to the CL machine. Thereafter, the CL machine outputs the selected document (step SB234).

(Transmission of Document from CL Machine to Backup Client Machine)

In the ubiquitous printing system illustrated in FIG. 31, a CL machine periodically (and/or at a specified timing) transmits the documents saved in the CL machine to another CL machine to use this CL machine as a backup client machine. For example, the image processing apparatus 1T as a CL machine periodically transmits the documents saved in the image processing apparatus 1T to the image processing apparatus 1S and the image processing apparatus 1U. Consequently, the image processing apparatus 1T uses the image processing apparatus 1S and the image processing apparatus 1U as backup client machines for the image processing apparatus 1T.

Figure 35:
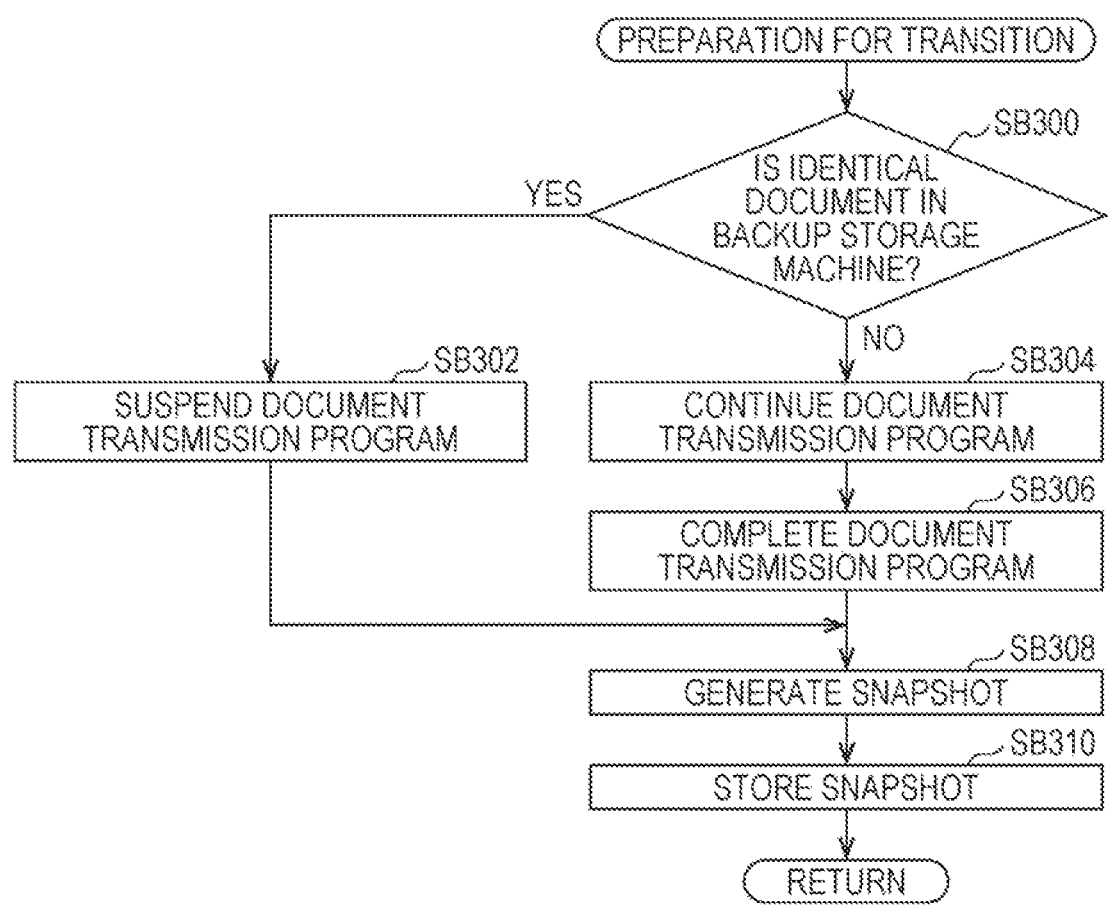
FIG. 35 is a diagram illustrating an example of a subroutine process of step S12 in FIG. 9.

FIG. 35 is a diagram illustrating an example of a subroutine process of step S12 in FIG. 9. The process in FIG. 35 is an example process that is performed when a condition for transition to the power saving mode is satisfied while the CPU 20 of an ST machine is executing the process of transmitting the documents in the ST machine to a backup cheat machine (document transmission program). The details of this process will be described with reference to FIG. 35.

In step SB300, the CPU 20 determines whether the document identical to the document to be transmitted by the image processing apparatus 1 is stored in the backup client machine. Each image processing apparatus 1 contains a list of documents saved in another image processing apparatus 1. In one example, the determination in step SB300 is implemented using the list. When determining that the document is stored in the backup client machine (YES in step SB300), the CPU 20 advances the control to step SB302. In other cases (NO in step SB300), the CPU 20 advances the control to step SB304.

In step SB302, the CPU 20 suspends the document transmission program.

In step SB304, the CPU 20 continues the document transmission program, and upon completion of the document transmission program being detected in step SB306, the CPU 20 advances the control to step SB308.

In step SB308, the CPU 20 generates a snapshot of the RAM 22.

In step SB310, the CPU 20 stores the generated snapshot in the nonvolatile memory 23. Thereafter, the CPU 20 returns the process to FIG. 9.

In the process of FIG. 35 described above, when a condition for transition to the power saving mode is satisfied during the execution of the document transmission program, if the document identical to the document to be transmitted is stored in the backup client machine, the document transmission program is suspended. The suspended document transmission program is resumed in step S28 (FIG. 10) after returning from the power saving mode.

(Distribution of Group Configuration List by TM Machine)

In the system of FIG. 31, a TM machine generates a group configuration list as illustrated in FIG. 32 and distributes it to each image processing apparatus in the group. In this system, in order to participate in a group, an image processing apparatus transmits a participation request to the TM machine. Upon receipt of the participation request as an ST machine or a CL machine from the image processing apparatus, the TM machine updates the group configuration list so as to add the image processing apparatus that has output the participation request, and distributes the updated group configuration list to each device in the group.

Figure 36:
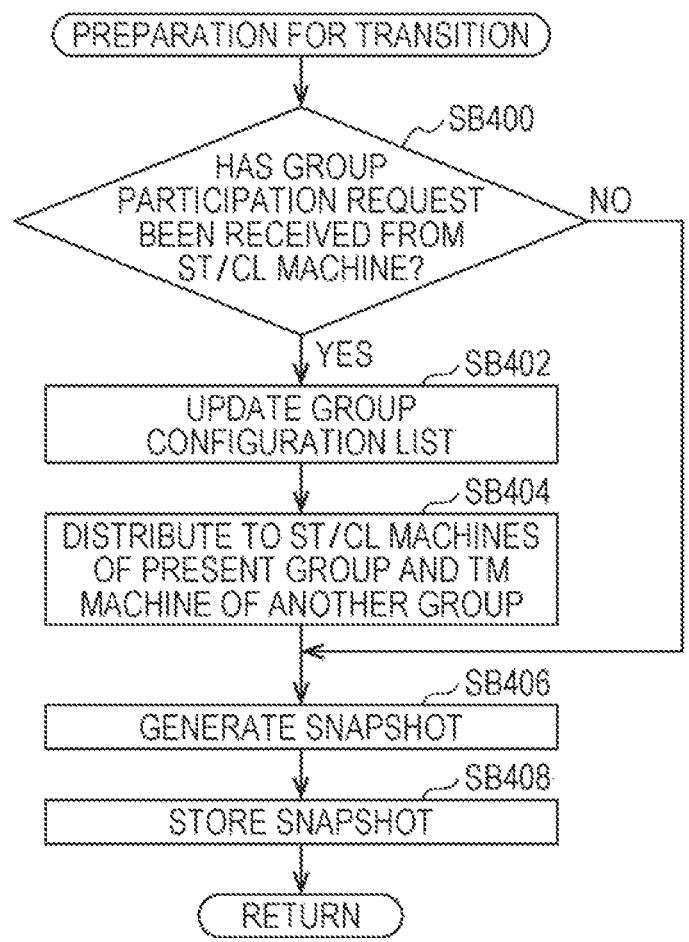
FIG. 36 is a diagram illustrating an example of a subroutine process of step S12 in FIG. 9.

FIG. 36 is a diagram illustrating an example of a subroutine process of step S12 in FIG. 9. The process in FIG. 36 is executed by the CPU 20 of the image processing apparatus 1 which is a TM machine. The details of this process will be described with reference to FIG. 36.

In step SB400, the CPU 20 determines whether a participation request for the group has been received from an ST machine or a CL machine. When determining that a participation request has been received (YES in step SB400), the CPU 20 advances the control to step SB402. In other cases (NO in step SB400), the CPU 20 advances the control to step SB406.

In step SB402, the CPU 20 updates the group configuration list so as to add the ST machine or the CL machine that has transmitted the participation request.

In step SB404, the CPU 20 distributes the updated group configuration list. Destinations of distribution are the ST machines and the CL machines in the group to which the TM machine equipped with the CPU 20 belongs, and the TM machine of another group.

In step SB406, the CPU 20 generates a snapshot of the RAM 22.

In step SB408, the CPU 20 stores the generated snapshot in the nonvolatile memory 23. Thereafter, the CPU 20 returns the process to FIG. 9.

In the process of FIG. 36 described above, the TM machine that manages the other devices (ST machines and CL machines) in the group gives priority to the distribution of the group configuration list over snapshot generation if a condition for transition to the power saving mode is satisfied during the process of distributing the group configuration list. As a result, the TM machine makes the transition to the power saving mode after the distribution of the group configuration list is completed.

(Reception of Group Configuration List by ST Machine or CL Machine)

Figure 37:
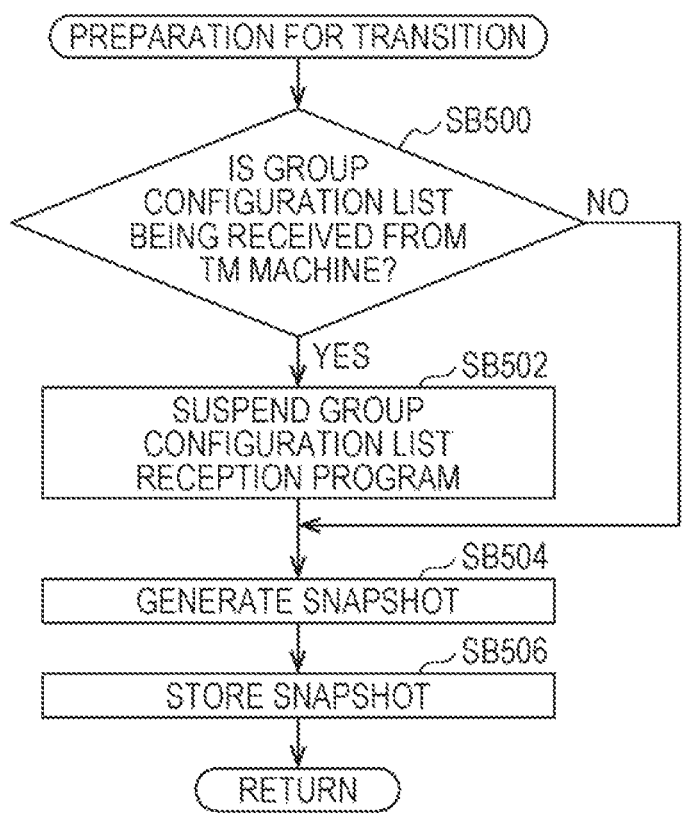
FIG. 37 is a diagram illustrating an example of a subroutine process of step S12 in FIG. 9.

FIG. 37 is a diagram illustrating an example of a subroutine process of step S12 in FIG. 9. The process in FIG. 37 is executed by the CPU 20 of the image processing apparatus 1 which is an ST machine or a CL machine. The details of this process will be described with reference to FIG. 37.

In step SB500, the CPU 20 determines whether the image processing apparatus 1 is currently receiving the group configuration list from the TM machine. When determining that the group configuration list is being received (YES in step SB500), the CPU 20 advances the control to step SB502. In other cases (NO in step SB500), the CPU 20 advances the control to step SB504.

In step SB502, the CPU 20 suspends the process of receiving the group configuration list.

In step SB504, the CPU 20 generates a snapshot of the RAM 22.

In step SB506, the CPU 20 stores the generated snapshot in the nonvolatile memory 23. Thereafter, the CPU 20 returns the process to FIG. 9.

In the process of FIG. 37 described above, if a condition for transition to the power saving mode is satisfied while the group configuration list is being received from the TM machine, snapshot generation is given priority over the group configuration list. After returning from the power saving mode, the reception of the group configuration list is resumed (step S28 in FIG. 10). At the time of resuming the reception, the CPU 20 may request the TM machine to retransmit the group configuration list.

<Preparation for Transition (10)>

Figure 38:
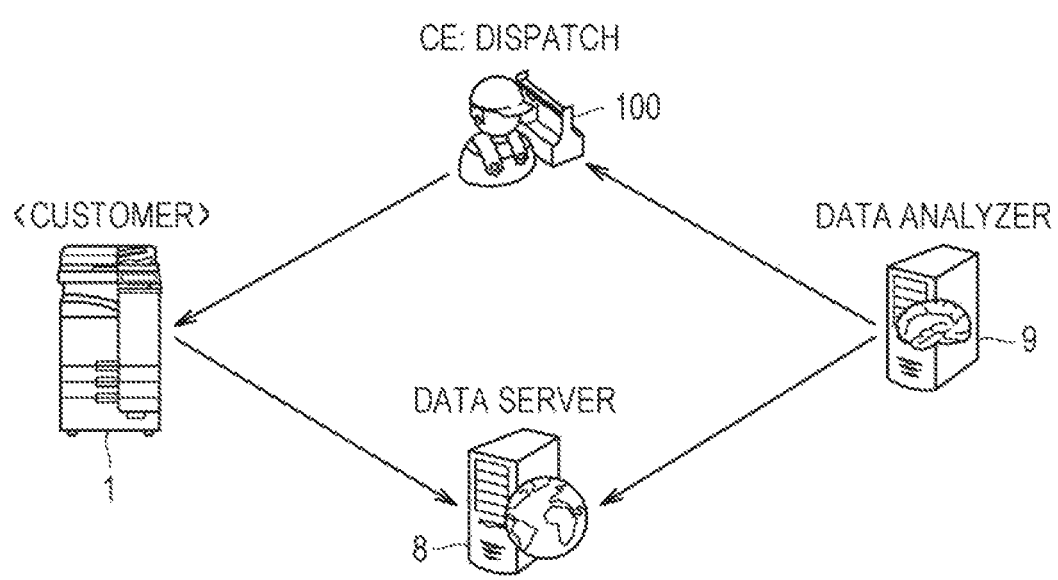
FIG. 38 is a diagram illustrating an example of a system in which the image processing apparatus is used.

FIG. 38 is a diagram illustrating an example of a system in which the image processing apparatus 1 is used. The system of FIG. 38 includes the image processing apparatus 1, a data server 8, and an analysis server 9. In the image processing apparatus 1, the scanner 12 and the printer 13 constitute an example of an image processing unit that executes an image processing operation.

The image processing apparatus 1 transmits data relating to the degree of exhaustion of the image processing unit, for example, periodically (and/or at a specified timing) to the data server 8. The data server 8 transfers the data to the analysis server 9. The analysis server 9 uses the data to predict the time for replacement of an element constituting the image processing unit. The prediction result is sent to a service center. The service center dispatches a worker 100 to the place where the image processing apparatus 1 is located (e.g., office) for the task of exchanging the element at the predicted time for replacement. The analysis server 9 may notify the image processing apparatus 1 of the time for replacement which is the prediction result once the prediction of the time for replacement of an element of the image processing apparatus 1 is completed.

An example of an element to be replaced is a toner unit used by the printer 13. In this case, the image processing apparatus 1 transmits, to the data server 8, the sum of coverages (printing rates) in the sheets printed by the printer 13 as an example of data relating to the degree of exhaustion of the image processing unit. The analysis server 9 predicts the time for replacement of the toner unit, for example, using the sum of coverages and the length of the period corresponding to the sum.

Another example of an element to be replaced is an intermediate transfer belt unit of the printer 13. In this case, examples of data relating to the degree of exhaustion of the image processing unit include the rotation distance of the intermediate transfer belt, the amount of toner adhesion to the intermediate transfer belt (printing rate of the toner image formed on the intermediate transfer belt), and/or the operating time of the printer 13. The analysis server 9 predicts the time for replacement of the intermediate transfer belt using, for example, these data and the length of the period corresponding to these data.

Figure 39:
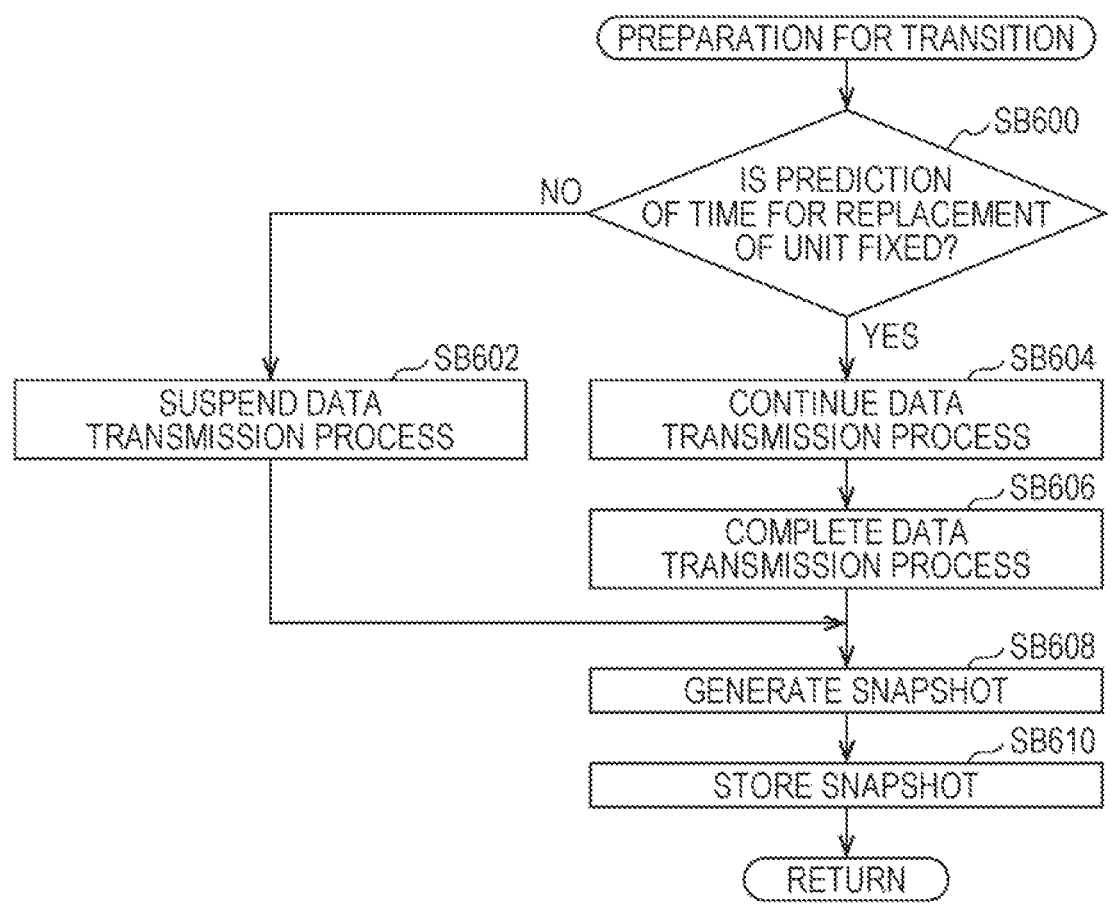
FIG. 39 is a diagram illustrating an example of a subroutine process of step S12 in FIG. 9.

FIG. 39 is a diagram illustrating an example of a subroutine process of step S12 in FIG. 9. The process in FIG. 39 is executed, for example, when a condition for transition to the power saving mode is satisfied while the image processing apparatus 1 is transmitting data relating to the degree of exhaustion of the image processing unit to the data server 8. The details of this process will be described with reference to FIG. 39.

In step SB600, the CPU 20 determines whether the prediction of the time for replacement is fixed for all the elements of the image processing unit whose time for replacement can be predicted. The CPU 20 implements the determination in step SB600, for example, by determining whether the time for replacement of each element has been sent from the analysis server 9. When determining that the prediction of the time for replacement of all the elements is fixed (YES in step SB600), the CPU 20 advances the control to step SB604. In other cases (NO in step SB600), the CPU 20 advances the control to step SB602.

In step SB602, the CPU 20 suspends the process (data transmission process) of acquiring and transmitting data relating to the degree of exhaustion of the image processing unit. The data transmission process includes the acquisition of the above data and the transmission of the data to the data server 8. The acquisition of the data may include the calculation of a numerical value such as the sum of coverages associated with toner.

In step SB604, the CPU 20 continues the data transmission process, and upon completion of the data transmission process being detected in step SB606, the CPU 20 advances the control to step SB608.

In step SB608, the CPU 20 generates a snapshot of the RAM 22.

In step SB610, the CPU 20 stores the generated snapshot in the nonvolatile memory 23. Thereafter, the CPU 20 returns the process to FIG. 9.

In the process of FIG. 39 described above, if the time for replacement of the image processing unit is not fixed when a condition for transition to the power saving mode is satisfied during the execution of the data transmission process, the execution of the data transmission process is given priority over snapshot generation. If the time for replacement of the image processing unit is fixed, the data transmission process is suspended, and a snapshot is generated and stored in the nonvolatile memory 23. The suspended data transmission process is resumed at step S28 (FIG. 10).

<Preparation for Transition (11)>

Figure 40:
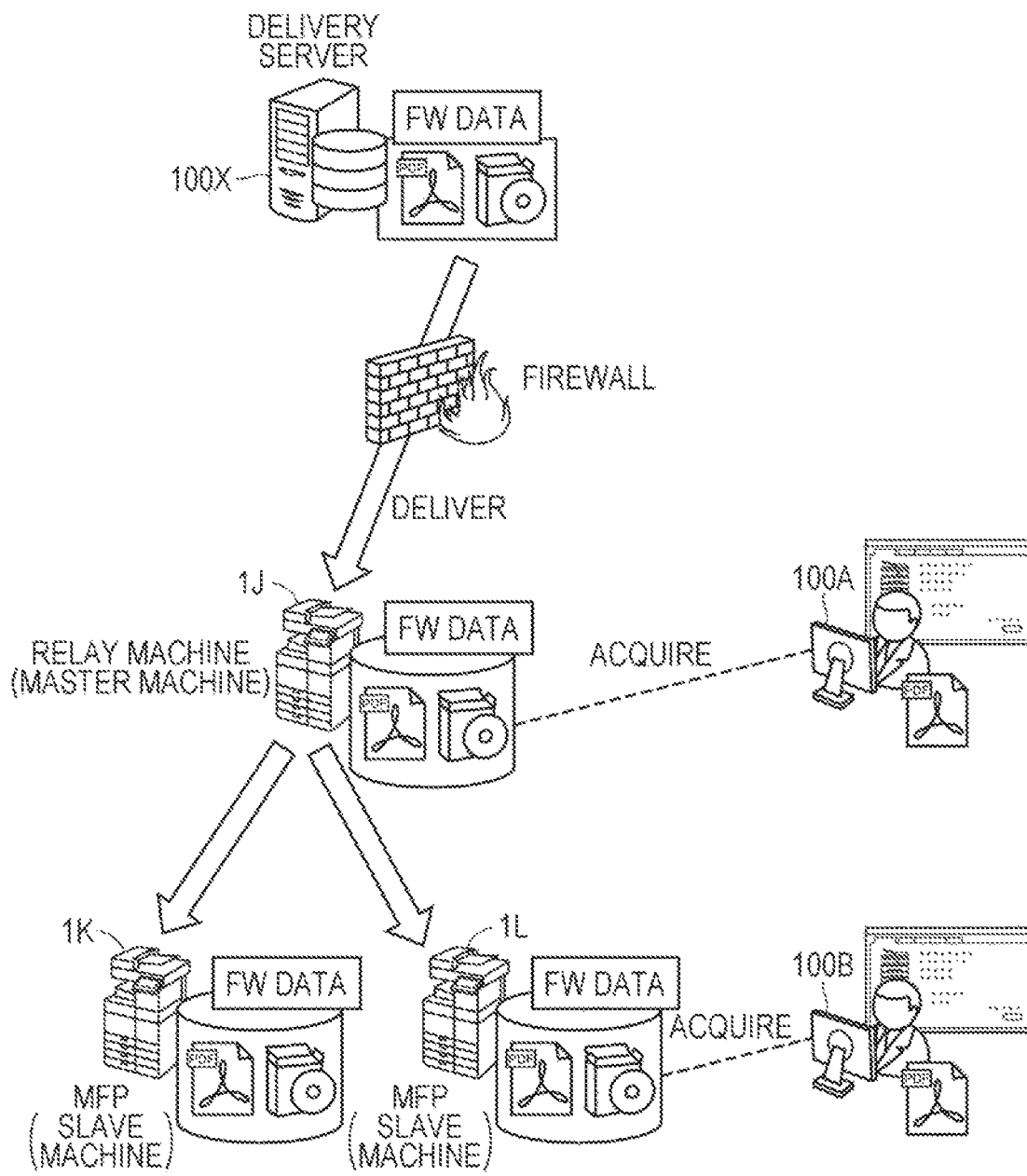
FIG. 40 is a diagram illustrating an exemplary configuration of a system in which the image processing apparatus is used.

FIG. 40 is a diagram illustrating an exemplary configuration of a system in which the image processing apparatus is used. The system in FIG. 40 includes a delivery server 100X, a relay machine (image processing apparatus 1J), slave machines (image processing apparatuses 1K and 1L), and user terminals (PCs 100A and 100B). In the system of FIG. 40, various data are delivered from the delivery server 100X to the image processing apparatus 1J across the firewall. The data to be delivered are, for example, FW data, a printer driver program, an application program, and/or a user manual. The image processing apparatus 1J distributes the delivered data to the slave machines (image processing apparatuses 1K and 1L). The user terminals (PCs 100A and 100B) acquire data such as printer drivers from the slave machines (image processing apparatuses 1K and 1L).

In the system of FIG. 40, if a condition for transition to the power saving mode is satisfied while the data delivered by the delivery server 100X are being received, the image processing apparatus 1 functioning as a master machine gives priority to the reception of the data over snapshot generation/storage. If a condition for transition to the power saving mode is satisfied while data are being received from the master machine, the image processing apparatus 1 functioning as a slave machine gives priority to snapshot generation/storage over the reception of the data.

Figure 41:
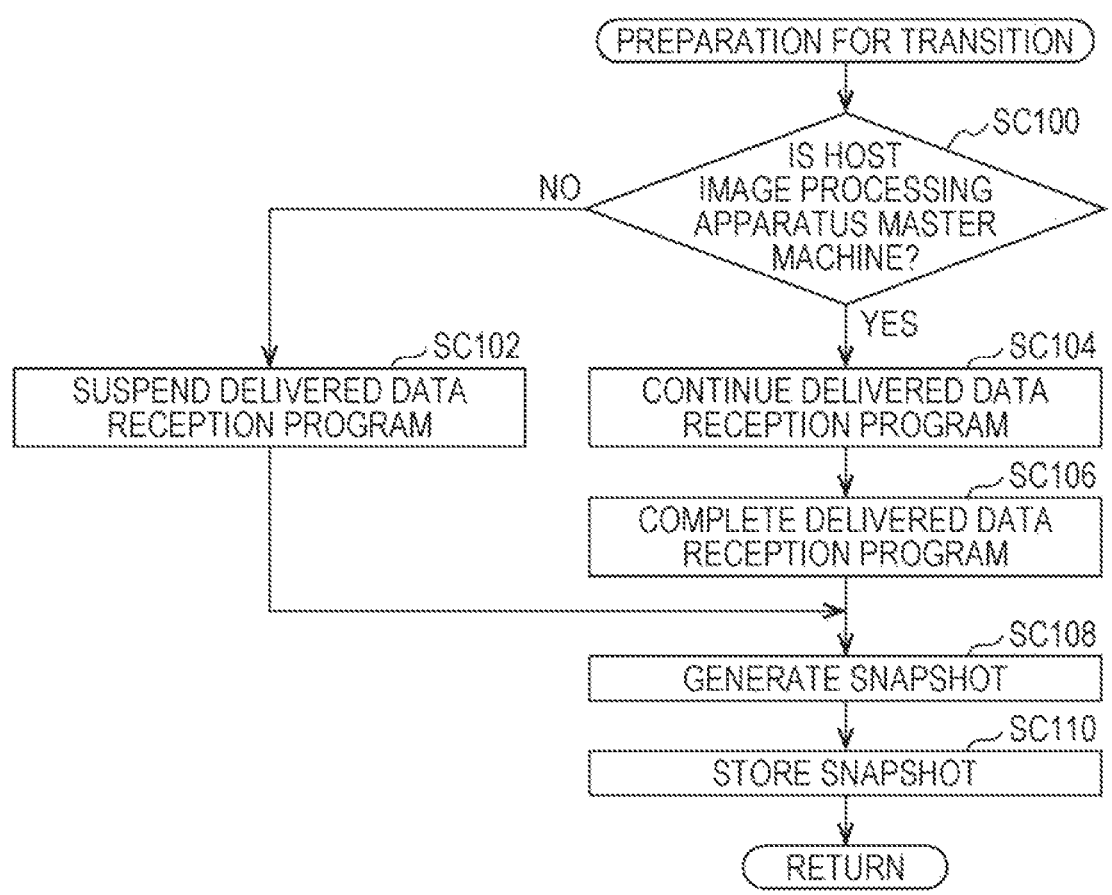
FIG. 41 is a diagram illustrating an example of a subroutine process of step S12 in FIG. 9.

FIG. 41 is a diagram illustrating an example of a subroutine process of step S12 in FIG. 9. The process in FIG. 41 is executed by the CPU 20 of an image processing apparatus of the system of FIG. 40 in which a condition for transition to the power saving mode is satisfied while data are being received. The details of this process will be described with reference to FIG. 41.

In step SC100, the CPU 20 determines whether the image processing apparatus 1 equipped with the CPU 20 is a master machine. When determining that the image processing apparatus 1 is a master machine (YES in step SC100), the CPU 20 advances the control to step SC104. In other cases (NO in step SC100), the CPU 20 advances the control to step SC102.

In step SC102, the CPU 20 suspends the reception process (delivered data reception program).

In step SC104, the CPU 20 continues the reception process, and upon completion of the reception process being detected in step SC106, the CPU 20 advances the control to step SC108.

In step SC108, the CPU 20 generates a snapshot of the RAM 22.

In step SC110, the CPU 20 stores the generated snapshot in the nonvolatile memory 23. Thereafter, the CPU 20 returns the process to FIG. 9.

<Preparation for Transition (12)>

The image processing apparatus 1 may be connected to a charging server that calculates the user charge according to the number of printed sheets. In this case, the image processing apparatus 1 includes a counter for counting the number of printed sheets output from the printer 13, and transmits the count value of the counter to the charging sewer. The count value may be transmitted each time the printer 13 executes a print operation (print job), may be transmitted at regular intervals, or may be transmitted when an operation for transmission is performed on the operation pail 18.

Figure 42:
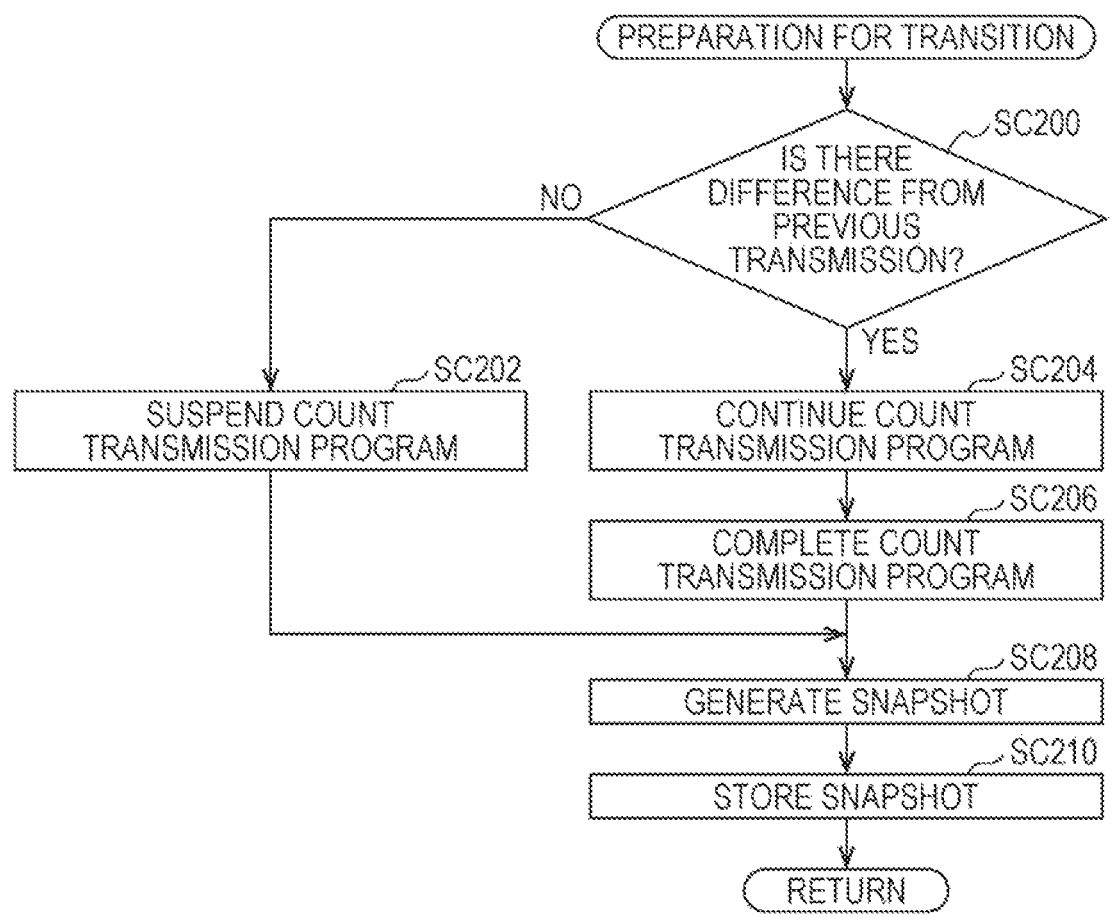
FIG. 42 is a diagram illustrating an example of a subroutine process of step S12 in FIG. 9.

FIG. 42 is a diagram illustrating an example of a subroutine process of step S12 in FIG. 9. The process in FIG. 42 is executed by the CPU 20 of an image processing apparatus in which a condition for transition to the power saving mode is satisfied while the count value is being transmitted to the charging server. The details of this process will be described with reference to FIG. 42.

In step SC200, the CPU 20 determines whether there is a difference between the count value to be transmitted and the previously transmitted count value. The HDD 24 of the CPU 20 may contain a transmission log of count values. The determination in step SC200 is implemented, for example, by comparing the previously transmitted count value recorded in the transmission log with the count value to be transmitted. If there is a difference between the two count values (YES in step SC200), the CPU 20 advances the control to step SC204. In other cases (NO in step SC200), the CPU 20 advances the control to step SC202.

In step SC202, the CPU 20 suspends the process of transmitting the count value (count transmission program).

In step SC204, the CPU 20 continues the process of transmitting the count value, and upon completion of the process being detected in step SC206, the CPU 20 advances the control to step SC208.

In step SC208, the CPU 20 generates a snapshot of the RAM 22.

In step SC210, the CPU 20 stores the generated snapshot in the nonvolatile memory 23. Thereafter, the CPU 20 returns the process to FIG. 9.

In the process of FIG. 42, if there is a difference between the count value to be transmitted and the previously transmitted count value, the transmission of the count value is given priority over snapshot generation/transmission. If there is no difference between the count value to be transmitted and the previously transmitted count value, the transmission of the count value is suspended, and snapshot generation/transmission is given priority over the transmission of the count value. The suspended transmission of the count value is resumed in step S28 (FIG. 10).

According to an embodiment of the present disclosure, a snapshot is stored in an area having a use other than snapshot storage. Thus, there is no need to set an area dedicated to snapshots in the nonvolatile storage device, and the storage capacity required by the nonvolatile storage device can be reduced, so that an increase in the cost of manufacturing the image processing apparatus can be avoided.

Although embodiments of the present invention have been described and illustrated in detail, the disclosed embodiments are made for purposes of illustration and example only and not limitation. The scope of the present invention should be interpreted by terms of the appended claims, and it is intended that all modifications within the meaning and scope equivalent to the scope of claims are included. It is intended that the inventions described in the embodiment and each modification are implemented either independently or in combination if possible.

What is claimed is:

1. An image processing apparatus comprising:
a volatile storage device;
a hardware processor that executes an information process using the volatile storage device; and
a nonvolatile storage device that stores data to be used for the information process, wherein
in response to a condition that makes it impossible to continue the information process being satisfied while the information process is being executed, the hardware processor generates a snapshot of the volatile storage device and stores the snapshot in an area of the nonvolatile storage device having a use other than snapshot storage,
in response to a condition that makes it possible to resume the information process being satisfied, the hardware processor reads the snapshot from the nonvolatile storage device and resumes the information process,
when the information process is a process of dividing and transmitting image data of a plurality of pages on a page basis, the hardware processor generates the snapshot after transmitting image data of any of the plurality of pages, and
when the information process is a process of collectively transmitting the image data of the plurality of pages, the hardware processor generates the snapshot after transmitting the image data of the plurality of pages.

2. The image processing apparatus according to claim 1, wherein in response to a condition that makes it impossible to continue the information process being satisfied while the information process is being executed, the hardware processor generates the snapshot after stopping or interrupting the information process.

3. The image processing apparatus according to claim 1, wherein the area for storing data to be used for the information process includes an area for storing image data.

4. The image processing apparatus according to claim 3, wherein in the area for storing image data, the hardware processor sets a partition for an area for storing the snapshot, and stores the snapshot in the partition.

5. The image processing apparatus according to claim 3, wherein when there is a continuous empty area with a size equal to or larger than a size of the snapshot in the area for storing image data, the hardware processor stores the snapshot in the empty area.

6. The image processing apparatus according to claim 3, wherein in response to a condition that makes it impossible to continue the information process being satisfied while the information process is being executed, the hardware processor generates the snapshot after a continuous empty area with a size equal to or larger than a size of the snapshot occurs in the area for storing image data.

7. The image processing apparatus according to claim 1, wherein
the nonvolatile storage device has a plurality of areas for storing data to be used for the information process, and
the hardware processor divides the snapshot into a plurality of files and stores each of the plurality of files in one of the plurality of areas in the nonvolatile storage device.

8. The image processing apparatus according to claim 1, wherein
the information process includes generation and transmission of image data, and
when the transmission is not being performed in the information process, the hardware processor generates the snapshot of the volatile storage device.

9. The image processing apparatus according to claim 1, wherein
the information process includes a process of transmitting image data to an external device, and
in response to a condition that makes it impossible to continue the information process being satisfied while the information process is being executed:
when the external device contains image data to be transmitted, the hardware processor stops the information process and generates the snapshot; and
when the external device does not contain image data to be transmitted, the hardware processor generates the snapshot after the information process is completed.

10. An image processing apparatus comprising:
a volatile storage device;
a hardware processor that executes an information process using the volatile storage device; and
a nonvolatile storage device that stores data to be used for the information process, wherein
in response to a condition that makes it impossible to continue the information process being satisfied while the information process is being executed, the hardware processor generates a snapshot of the volatile storage device and stores the snapshot in an area of the nonvolatile storage device having a use other than snapshot storage,
in response to a condition that makes it possible to resume the information process being satisfied, the hardware processor reads the snapshot from the nonvolatile storage device and resumes the information process, the information process includes a process of transmitting image data to an external device in a network, and in response to a condition that makes it impossible to continue the information process being satisfied while the information process is being executed:

when a different device in the network contains image data to be transmitted, the hardware processor requests the different device to transmit, to the external device, the image data to be transmitted, stops the information process, and generates the snapshot; and when a different device in the network does not contain image data to be transmitted, the hardware processor generates the snapshot after the information process is completed.

11. The image processing apparatus according to claim 1, wherein in response to a condition that makes it impossible to continue the information process being satisfied while the information process is being executed, when the information process is expected to be completed within a given time, the hardware processor generates the snapshot after the information process is completed.

12. The image processing apparatus according to claim 1, wherein the information process includes a process of transmitting a fax document, when a degree of importance of a fax document to be transmitted is low, the hardware processor interrupts the information process and generates the snapshot, and when a degree of importance of a fax document to be transmitted is high, the hardware processor generates the snapshot after the information process is completed.

13. The image processing apparatus according to claim 1, wherein the hardware processor determines a degree of priority of the information process using at least one of information acquired as a result of character recognition on a fax document to be transmitted and information on a destination of a fax document to be transmitted.

14. An image processing apparatus comprising:

a volatile storage device;

a hardware processor that executes an information process using the volatile storage device; and a nonvolatile storage device that stores data to be used for the information process, wherein in response to a condition that makes it impossible to continue the information process being satisfied while the information process is being executed, the hardware processor generates a snapshot of the volatile storage device and stores the snapshot in an area of the nonvolatile storage device having a use other than snapshot storage, in response to a condition that makes it possible to resume the information process being satisfied, the hardware processor reads the snapshot from the nonvolatile storage device and resumes the information process, the information process includes a process of receiving a fax document, and the hardware processor:

determines a degree of priority of the information process using at least one of information acquired as a result of character recognition on a fax document being received and information on a sender of a fax document being received;

generates the snapshot after the information process is completed when the degree of priority of the information process is high; and interrupts the information process and generates the snapshot when the degree of priority of the information process is low.

15. The image processing apparatus according to claim 1, wherein the information process is a process of receiving a fax document, the image processing apparatus further includes an interface that accepts an instruction to print the fax document received, and the hardware processor:

interrupts the information process and generates the snapshot when the interface has accepted before an instruction to print a fax document received from a sender of a fax document being received; and generates the snapshot after the information process is completed when the interface has not accepted before an instruction to print a fax document received from a sender of a fax document being received.

16. The image processing apparatus according to claim 1, wherein the information process is a virus scan of the nonvolatile storage device, and the hardware processor:

stops the information process and generates the snapshot when a time interval between a running virus scan and a last virus scan is equal to or less than a given period; and generates the snapshot after the information process is completed when a time interval between a running virus scan and a last virus scan exceeds the given period.

17. The image processing apparatus according to claim 10, wherein the area for storing data to be used for the information process includes an area for storing image data.

18. The image processing apparatus according to claim 14, wherein the area for storing data to be used for the information process includes an area for storing image data.

* * * * *